(12) United States Patent
Kosa

(10) Patent No.: US 12,449,194 B2
(45) Date of Patent: Oct. 21, 2025

(54) INSTANT COOLER/FREEZER USING THE SHAKE METHOD

(71) Applicant: ORBITAL SHAKE SOGUTMA TEKNOLOJILERI A. S., Istanbul (AR)

(72) Inventor: Umit Kosa, Istanbul (TR)

(73) Assignee: ORBITAL SHAKE SOGUTMA TEKNOLOJILERI A. S., Istanbul (TR)

( * ) Notice: Subject to any disclaimer, the term of this patent is extended or adjusted under 35 U.S.C. 154(b) by 174 days.

(21) Appl. No.: 18/548,596

(22) PCT Filed: Mar. 2, 2021

(86) PCT No.: PCT/TR2021/050185
§ 371 (c)(1),
(2) Date: Sep. 1, 2023

(87) PCT Pub. No.: WO2022/186785
PCT Pub. Date: Sep. 9, 2022

(65) Prior Publication Data
US 2024/0142169 A1    May 2, 2024

(51) Int. Cl.
*F25D 31/00* (2006.01)
*F25D 17/06* (2006.01)

(52) U.S. Cl.
CPC .......... *F25D 31/006* (2013.01); *F25D 17/06* (2013.01); *F25D 2400/28* (2013.01)

(58) Field of Classification Search
CPC .......... F25D 2331/805; F25D 2400/361; F25D 2700/02; F25D 2700/06; F25D 2700/16;
(Continued)

(56) References Cited

U.S. PATENT DOCUMENTS 9,528,757 B2 * 12/2016 Dieckmann .......... F25D 31/007
10,119,774 B1   11/2018 Kosa et al.
(Continued)

FOREIGN PATENT DOCUMENTS

TR      200602045 A2   10/2007
TR      201602858       3/2016
WO     2019222445 A1  11/2019

*Primary Examiner* — Ana M Vazquez
(74) *Attorney, Agent, or Firm* — Bayramoglu Law Offices LLC

(57) ABSTRACT

Disclosed is an instant cooler/freezer using orbital shaking rapidly to chill beverages by circulating a formulated cooling liquid through insulated cooling blocks. A pump system circulates the liquid through hoses, a tank, and a PU-insulated enclosure to minimize energy loss. Cooling blocks, clamped around the beverage by servo-driven arms, shake orbitally via an eccentric hub and gear system. Sensors including thermocouples and PCBs monitor temperature, control operations, and provide real-time data. An elevator system dispenses the chilled beverage, while safety mechanisms such as service cover sensors and hiding covers ensure user protection. A screen enables user interaction. The system is powered by a regulated electrical supply and includes a cooling unit with a compressor, condenser, and evaporator to maintain liquid temperature. All components are housed within a thermally insulated main cover, allowing for efficient and safe rapid cooling.

13 Claims, 26 Drawing Sheets

(58) Field of Classification Search
CPC ... F25D 29/005; F25D 2201/10; A47F 3/0426
See application file for complete search history.

(56) References Cited

U.S. PATENT DOCUMENTS

| | | | |
|---|---|---|---|
| 2003/0209029 A1* | 11/2003 | Lee ..................... | F25D 23/006 |
| | | | 62/379 |
| 2004/0144103 A1* | 7/2004 | Lee ..................... | F25D 31/007 |
| | | | 62/62 |
| 2006/0185372 A1* | 8/2006 | Conde Hinojosa ..... | F25D 23/12 |
| | | | 62/373 |
| 2015/0233631 A1 | 8/2015 | Shuntich | |
| 2021/0130083 A1* | 5/2021 | Fonte .................... | B65D 17/28 |

* cited by examiner

INSTANT COOLER/FREEZER USING THE SHAKE METHOD

CROSS REFERENCE TO THE RELATED APPLICATIONS

This application is the national phase entry of International Application No. PCT/TR2021/050185, filed on Mar. 2, 2021, the entire contents of which are incorporated herein by reference.

TECHNICAL FIELD

The invention subject to application relates to a cooler/freezer that uses a restricted orbital shake method suitable for use for all kinds of packaged objects, such as packaged beverages, foodstuffs and alike.

BACKGROUND

Many systems and techniques are used to cool or freeze packaged beverages, foodstuffs and all kinds of packaged objects. These techniques are as follows;
- The best known of these techniques are standard vertical beverage cooling refrigerators.
- Deep freezers
- Cooling process by immersing in refrigerant and/or rotating
- Cooling process by putting bottles in a sleeve/sleeves in the antifreeze Due to their design, vertical type refrigerators cause the cold air they produce to go out every time the door is opened/every time it is used. In addition, they cannot cool the beverages homogeneously despite the air circulation fans they contain and they are also slow. They hardly cool a 500 ml beverage of 24 degrees in 8-9 hours on average. In addition, since they have difficulty reaching the desired cold level, they work 24 hours a day and cause serious electricity consumption.

Since deep freezers are very cold and the beverages inside are stable, they cause freezing. They are slow since there is no active movement, it takes an average of 50 minutes to take the product before it freezes.

In technique immersing in refrigerant, the product comes out wet and the user needs to wipe it up. It also allows bacteria to live in this liquid that directly contacts the packaged beverages and the consumer is exposed to this refrigerant directly through their lips. Since the liquid used is generally water, it cannot be cooled too much so that it does not freeze, and therefore it is not fast enough in time and is not preferred by the sector. They also can't control to what degree the cooled beverages will be cooled.

Antifreeze is used instead of water in the method that is put in the sleeve in the cooler/antifreeze liquid. However, the liquids in the package cannot cool down quickly enough since there is no movement, in addition to that, tearing problems are frequently encountered with the sleeves and they cause serious antifreeze losses.

The invention in the document no TR 2006/02045, which is in the state of the art, relates to a fast-cooling method and setup. But there is not an orbital shake method in this document. It cannot provide homogeneous cooling provided by the orbital shake method. Because, liquid in the package thanks to orbital shake method and homogeneous mix, constantly hits the inner wall of the package being cooled and since the shaking continues, it shifts inside and provides the most homogeneous heat exchange possible. This feature is not available in the TR 2006/02045 document. In addition, there is no cooling block for bottles in document TR 2006/02045.

In the patent documents in the state of the art, antifreeze is used instead of water in the method placed in the sleeve in the cooling liquid, but due to the lack of movement liquids in the package cannot cool down quickly enough. And these sleeves can't help the bottle to stand still and the cooling of the liquid to ensure homogeneous heat exchange by literally wrapping the bottle.

Another patent document in the state of the art is the patent document numbered 2016/02858. In this method, the degrees of packaged beverages can be measured, but since the cooling system cannot control the temperatures of beverages one by one, it may cause the freezing of the cooled beverages as well as does not allow special temperature adjustments. Again, the materials that can be used in the multiple sleeves used in this technique are not at a sufficient level in terms of thermal conductivity and cause a significant energy consumption. In our current invention, each hall can be measured individually and the cooling system can be controlled and completely eliminates the problems like freezing. In addition, the consumer can cool the beverage at will and this is an important situation for beverage companies in terms of marketing and has a great impact on the commercialization of the business. In addition, due to the fact that the eccentric bearing, which is seen in the patent document numbered 2016/02858 and stated to guide the orbital shake movement, is single and the entire cooling section is carried on the beverage wheels, serious deviations are observed in the oscillation movement. Due to these deviations, the system cannot perform the orbital shake movement properly and may cause unpredictable changes in cooling performance.

When considering the current applications in the state of the art, it is seen that there is no application with the same features as the instant cooler/freezer using the orbital shake method.

SUMMARY

The present invention relates to the instant cooler/freezer using the orbital shake method in order to eliminate the above-mentioned disadvantages and bring new advantages to the related technical field.

It is about an economical instant cooler/freezer that provides fast, practical and homogeneous cooling and dry service by placing the packaged products to be cooled by orbital shake method.

The aim of the invention is to apply cooling and minimize energy loss by sending all the energy produced directly to the packaged beverage when requested. In each cooling process, the beverage is taken at the degree specified by the customer and the customer is prevented from buying warm or hot drinks. In this way, the product is guaranteed to deliver cold drinks.

Another purpose of the invention is to determine the degree requested by the customer and to eliminate unwanted freezing problems.

The purpose of the present invention is to provide a system performs the cooling/freezing process of packaged beverages and packaged foodstuffs in a fast and efficient manner and ensures that the product comes out dry.

In this invention, packaged beverages are served dry because the packaged beverages are not in contact with the cooling liquid. The liquids used for cooling never comes into contact with the packaged beverage that the consumer takes into their hands. So that, there is no possibility of any bacterial problem. It can go down to much lower degrees than liquid water used for cooling (−16° C./−60° C.). For this reason, much faster cooling can be realized. The consumer can decide the temperature of the beverage will be cooled to and it guarantees customer satisfaction. Since it does the cooling process using both a very low temperature cooling liquid and an orbital shake action, it is very fast.

Another purpose of the invention is to provide a much more efficient cooling by consuming electricity when in need, instead of performing active cooling for 24 hours like standard refrigerators.

The preferred embodiment of the invention is that it has a touch screen that enables the customer to manage the invention.

The preferred embodiment of the invention is that it provides cooling blocks where the customer can place beverages and can be changed according to different packaged beverage shapes.

The preferred embodiment of the invention is that it has UVC Led lamps to sterilize the packaged beverages.

The preferred embodiment of the invention is that the cooling blocks and the packaged beverages inside have a shaker motor that makes the orbital shake movement at the desired speed.

The preferred embodiment of the invention is that it has an eccentric gear allowing a special placement that dampens the oscillation arising from the orbital shake movement.

The preferred embodiment of the invention is that it has a service cover that protects the customer from movement and UVC Led rays during the cooling process.

The preferred embodiment of the invention is that it has a service cover button that stops the cooling process and UVC led lamps in case the service door is opened for any reason during the cooling process.

The preferred embodiment of the invention is that it has a concealing cover that prevents any object from falling on the moving mechanism or from reaching the customer when the beverages are being poured.

The preferred embodiment of the invention is that it has hoses allowing the cooling liquid to go to the cooling block.

The preferred embodiment of the invention is that it has cooling pumps that can be controlled and provide separate cooling liquid to each cooling block.

The preferred embodiment of the invention is that it has a PU (Polyurethane) Main Insulation Case.

The preferred embodiment of the invention is that it has a cooling liquid tank that keeps the invention ready to cool the packaged beverages.

The preferred embodiment of the invention is that it has a thermocouple that allows to see instantly how many degrees the cooled packaged beverages are and understand when they reach the desired temperature.

The preferred embodiment of the invention is that it has a PCT motherboard, which keeps records of the cooling processes that control the frequency of use of the clamping and elevator servos that control and command the processes according to the instantaneous degrees of the packaged beverages in each hall, and allows the manufacturer to be followed up on the internet if requested.

The preferred embodiment of the invention is that it has a Mini PCB located under each cooling block, that processes the data coming from the thermocouple and beverage button and processes it to the PCB.

The preferred embodiment of the invention is that it has an elevator servo that lowers the packaged beverages placed in the cooling block into the cooling hall and brings them up again for service to the customer at the end of the process.

The preferred embodiment of the invention is that it has a clamping servo that provides a tight grip on the packaged beverages placed in the cooling block.

The preferred embodiment of the invention is that it has a beverage button that allows user to understand if there is a packaged beverage in the cooling block.

The preferred embodiment of the invention is that it has a heat exchanger that provides cooling of the cooling liquid.

The preferred embodiment of the invention is that it has a thermocouple that controls the temperature of the cooling liquid and provides automatic cooling.

The preferred embodiment of the invention is that it has an electronic panel cover that protects the electronics from moisture.

The preferred embodiment of the invention is that it has the cooling blocks and packaged beverages have eccentric cores that enable the orbital shake movement.

The preferred embodiment of the invention is that it has an insulated cold stock area that is used to keep cooled beverages cold with high efficiency.

The preferred embodiment of the invention is that it has a radiator and a fan that provides cooling if deemed necessary by measuring the temperature in the cold stock area.

BRIEF DESCRIPTION OF THE DRAWINGS

In order to explaining the instant cooler/freezer using the orbital shake method developed with this invention better, the prepared figures are explained below.

DEFINITIONS OF ELEMENTS/SECTIONS/PARTS THE INVENTION

Figure 1:
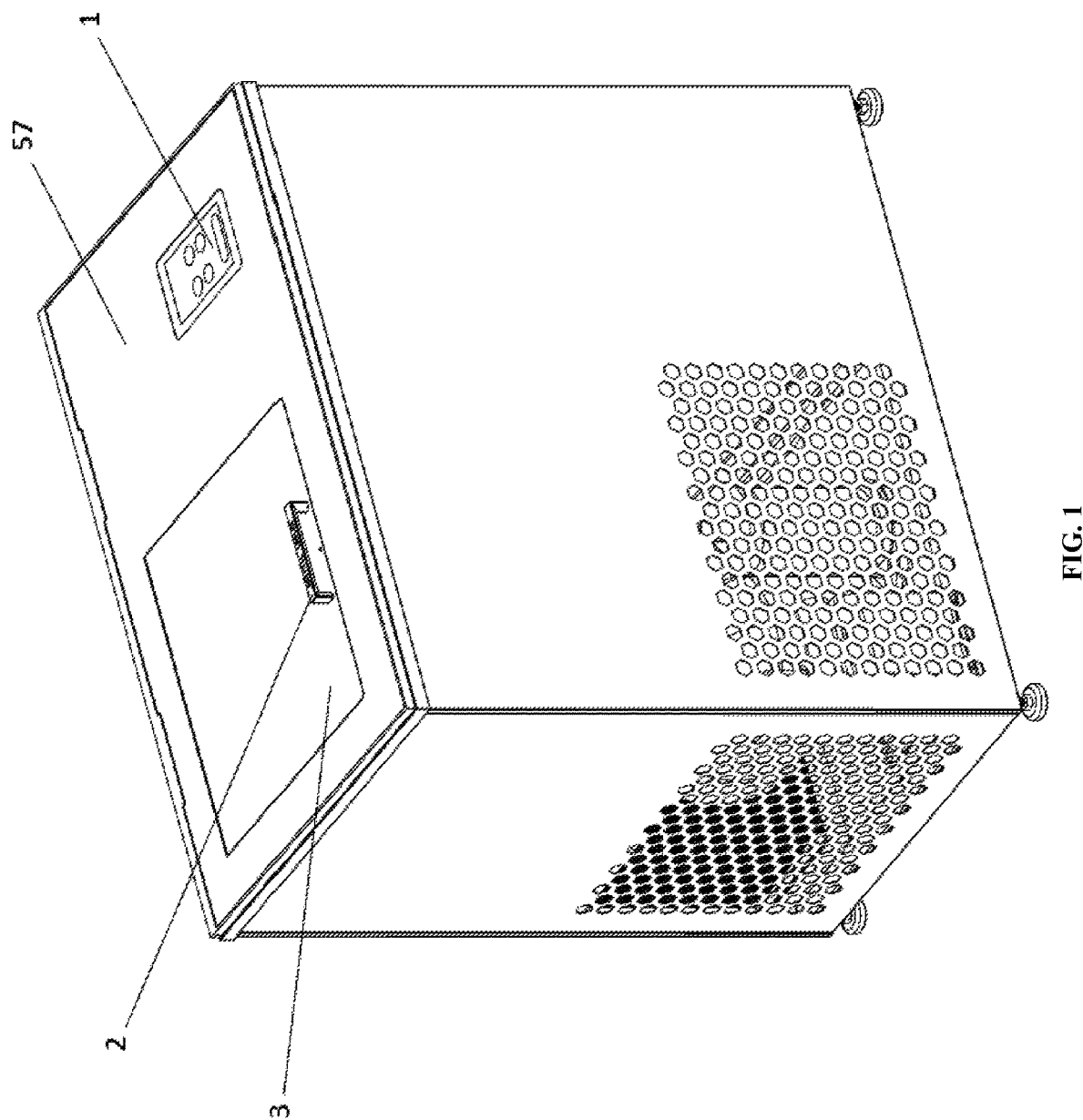
FIG. 1—General view.
Figure 2:
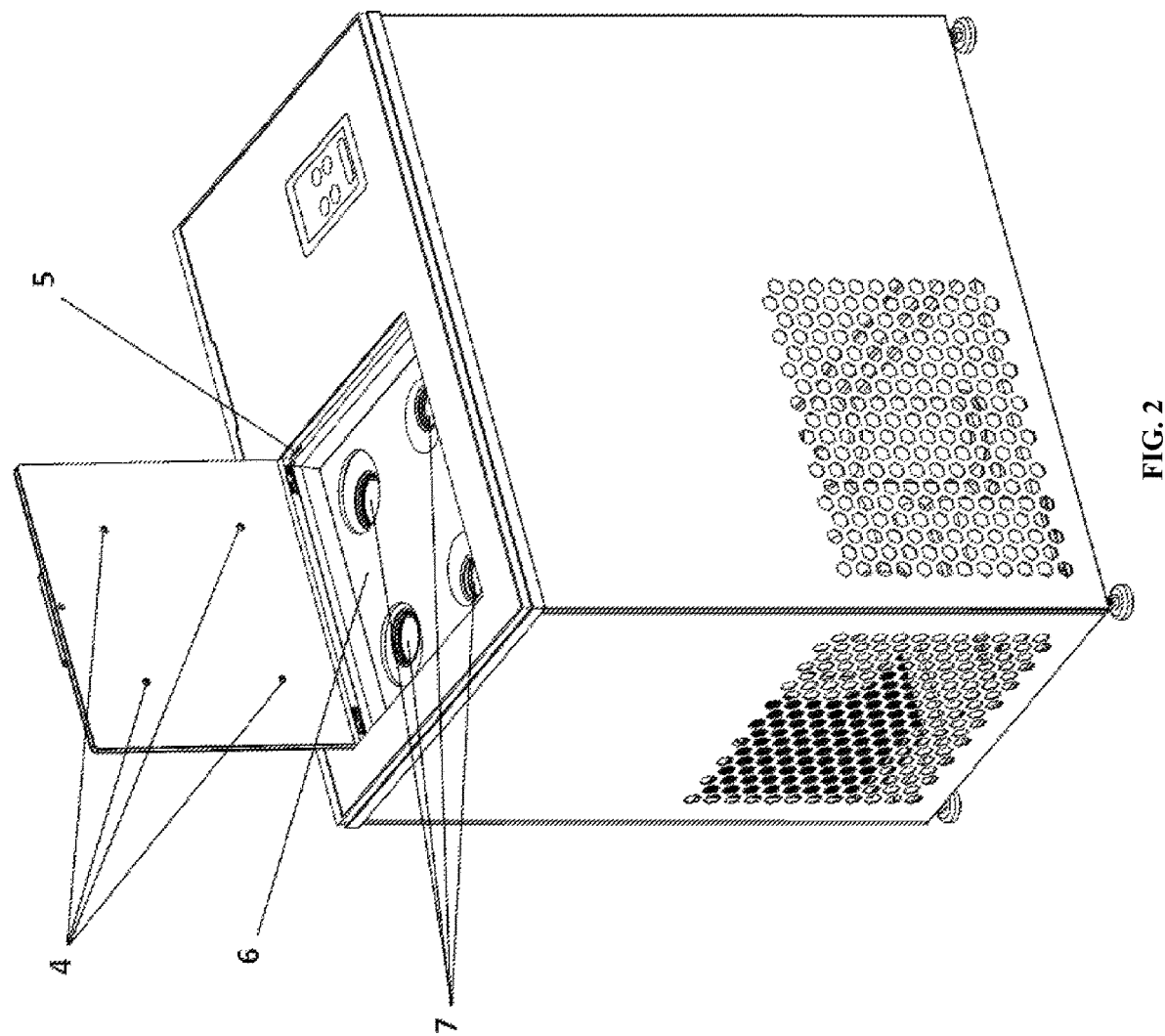
FIG. 2—Service cover open general view.
Figure 3:
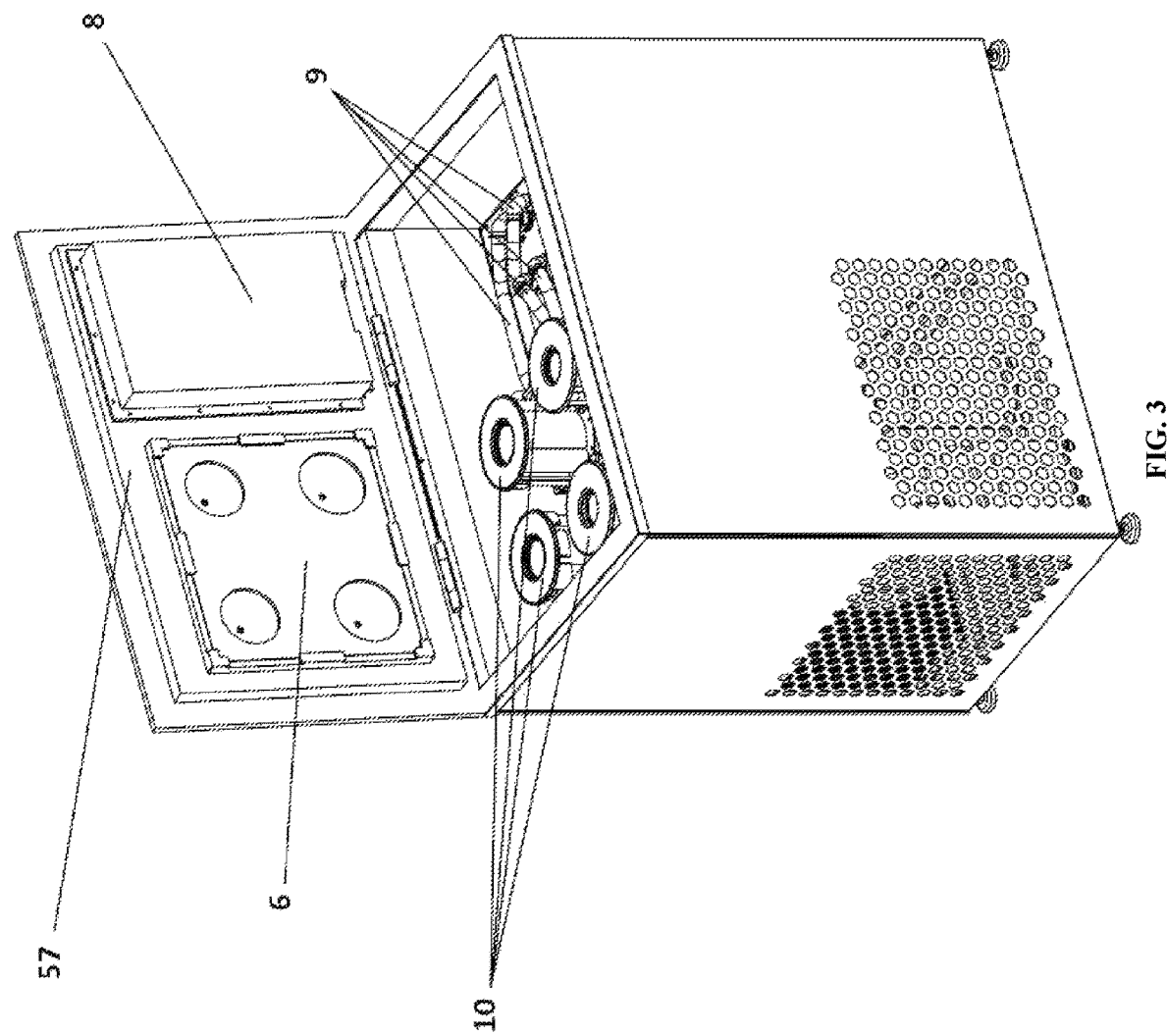
FIG. 3—Main Cover open view.
Figure 4:
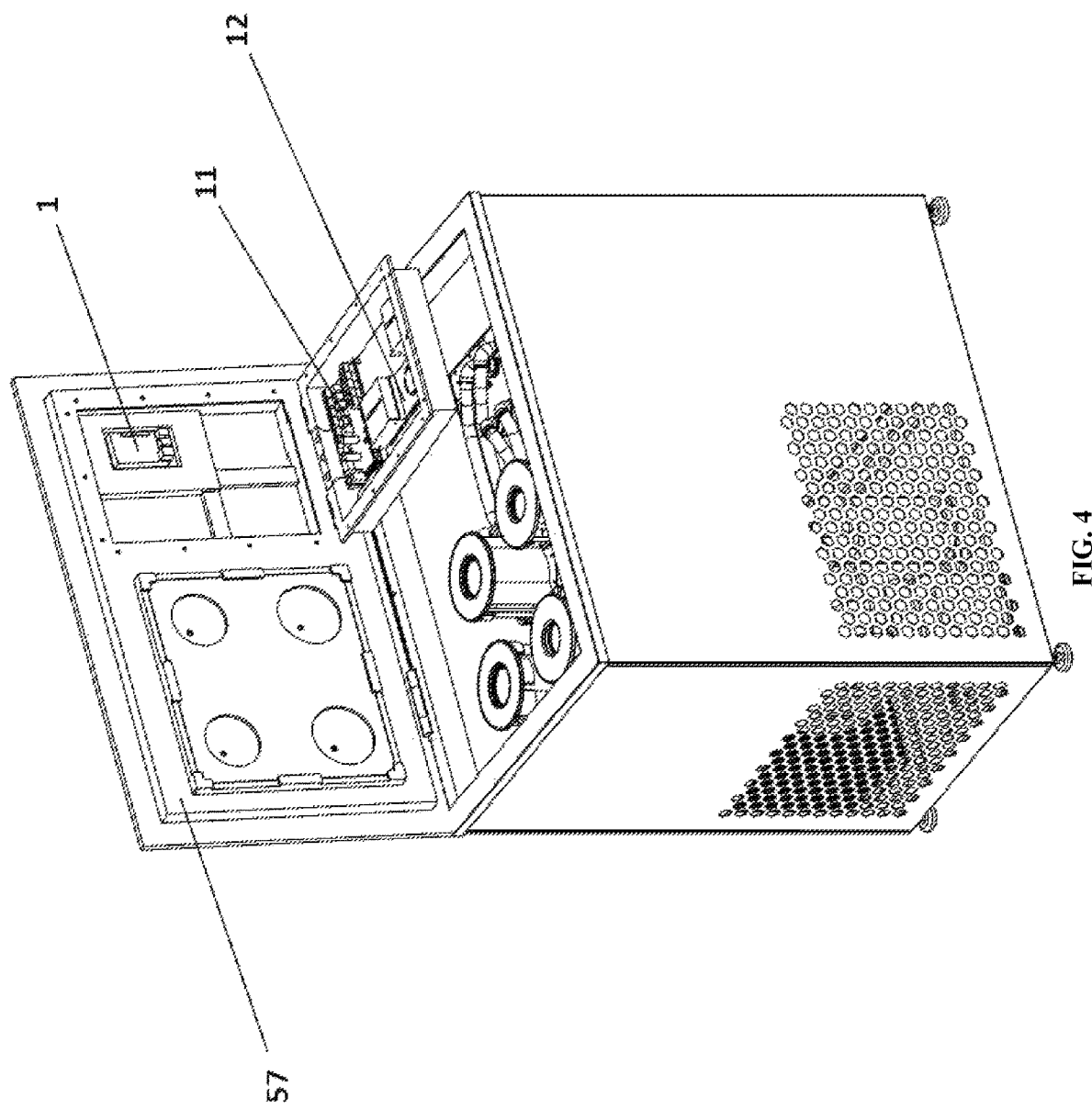
FIG. 4—Main Cover and Electrical Panel cover open view.
Figure 5:
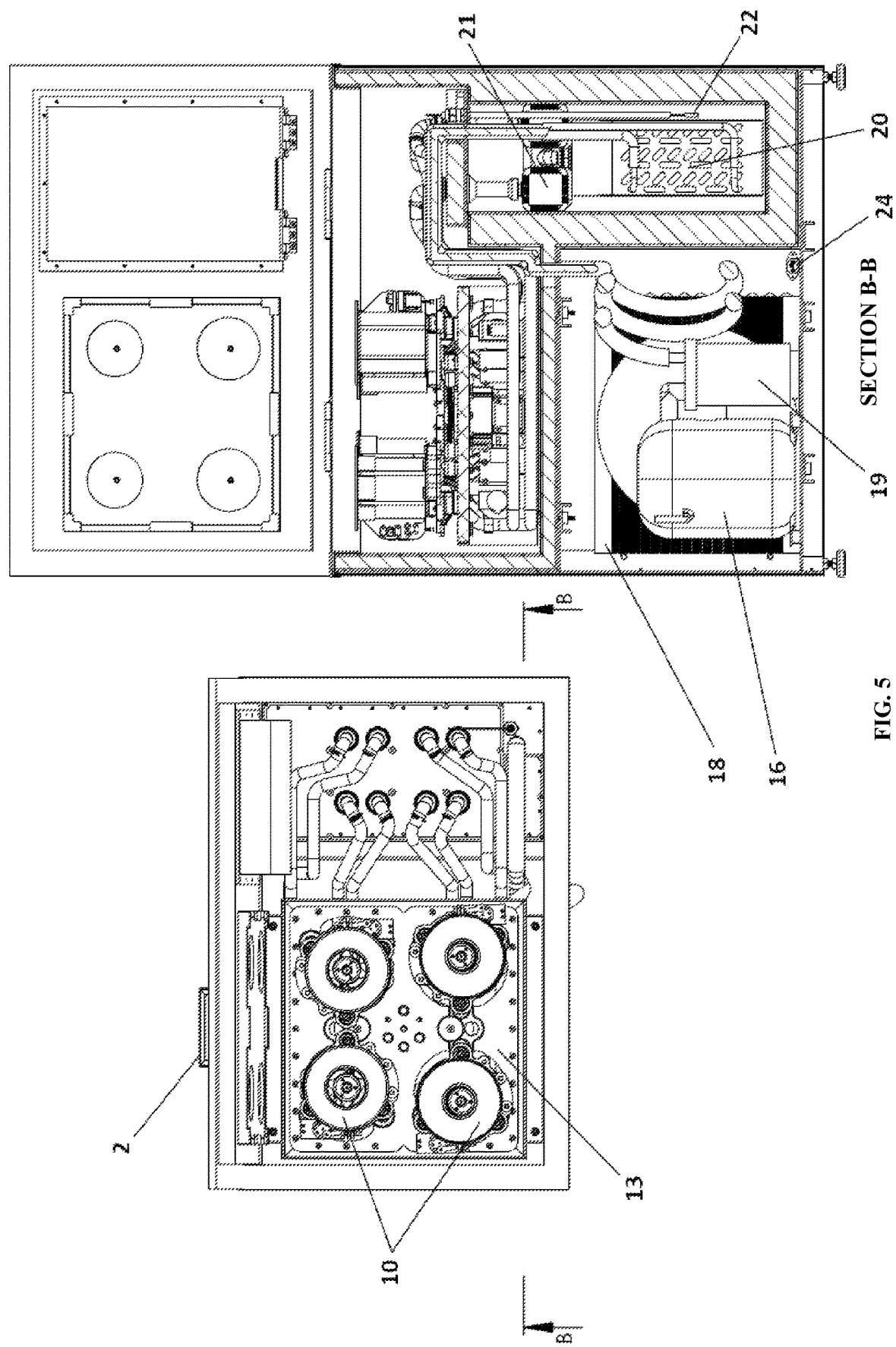
FIG. 5—Main Cover open top and Front Sectional view.
Figure 6:
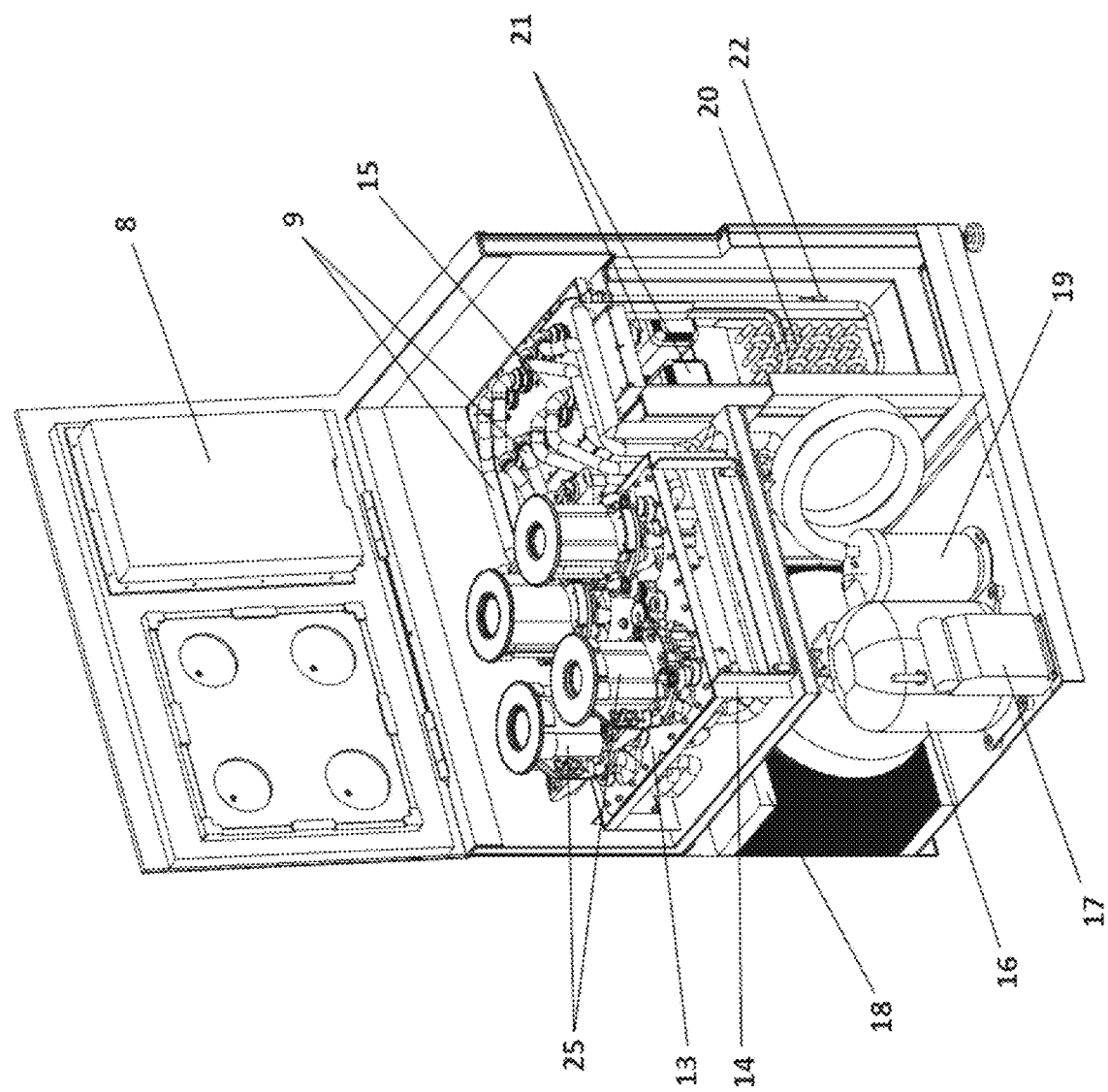
FIG. 6—Main cover open, Left and Front sections are naked view.
Figure 7:
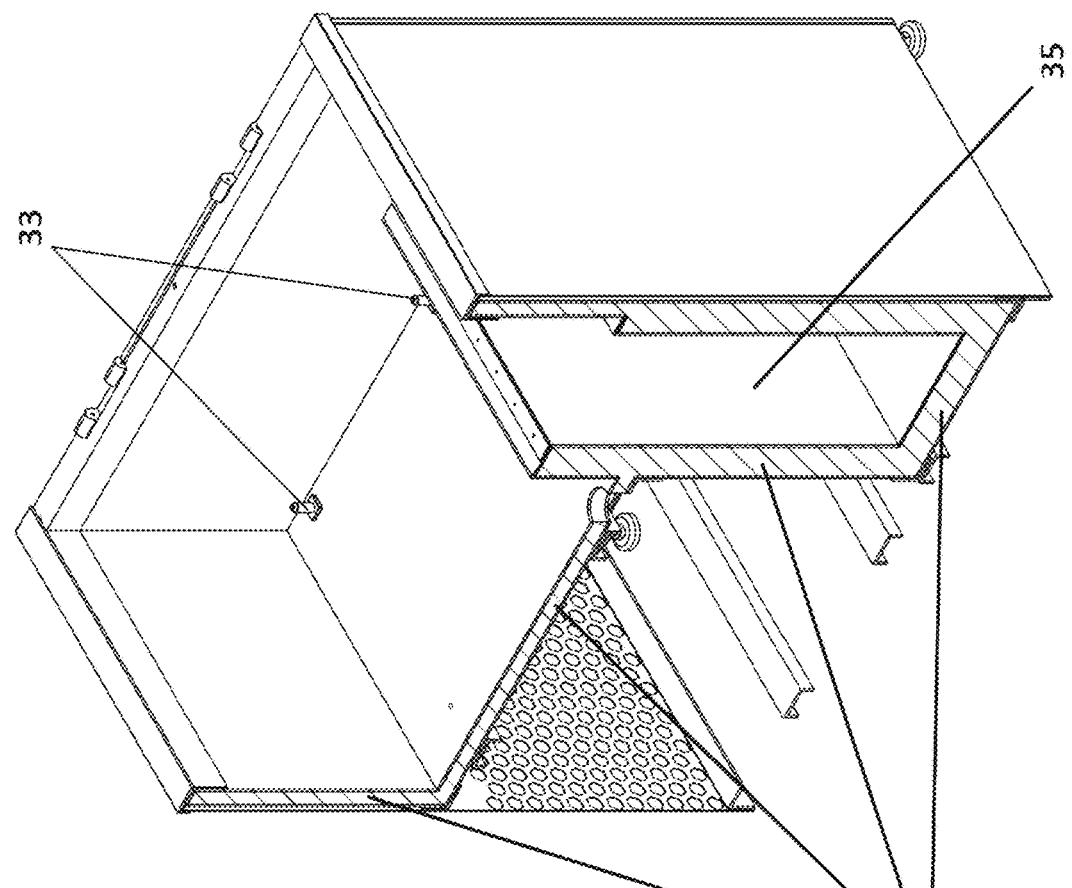
FIG. 7—Top and front sectional view of the main PU Insulation Case.
Figure 7:
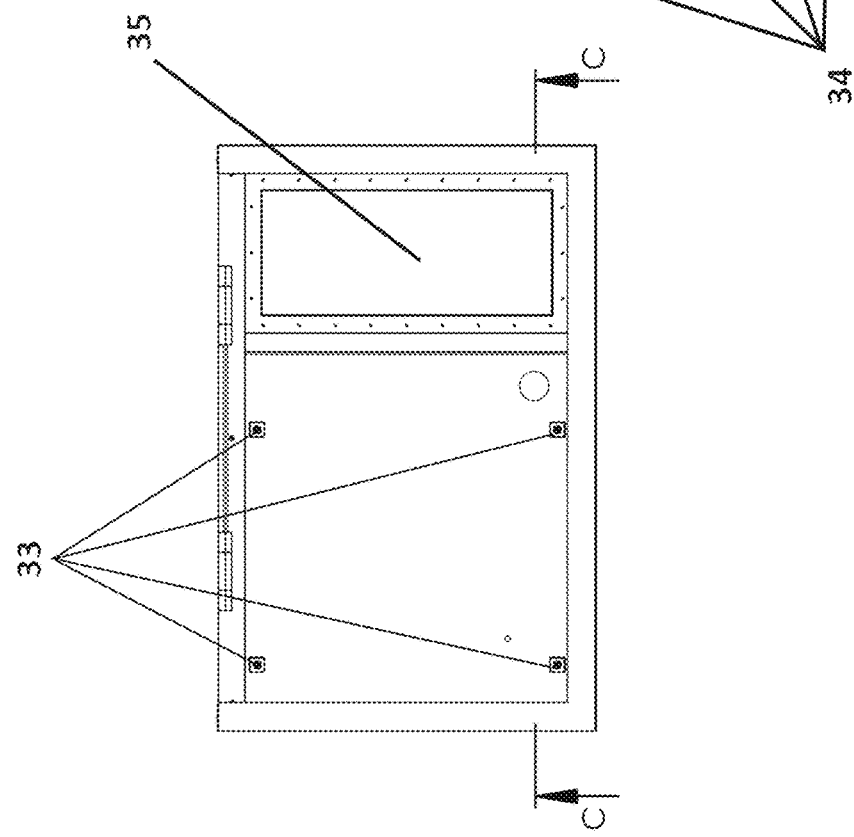
Figure 8:
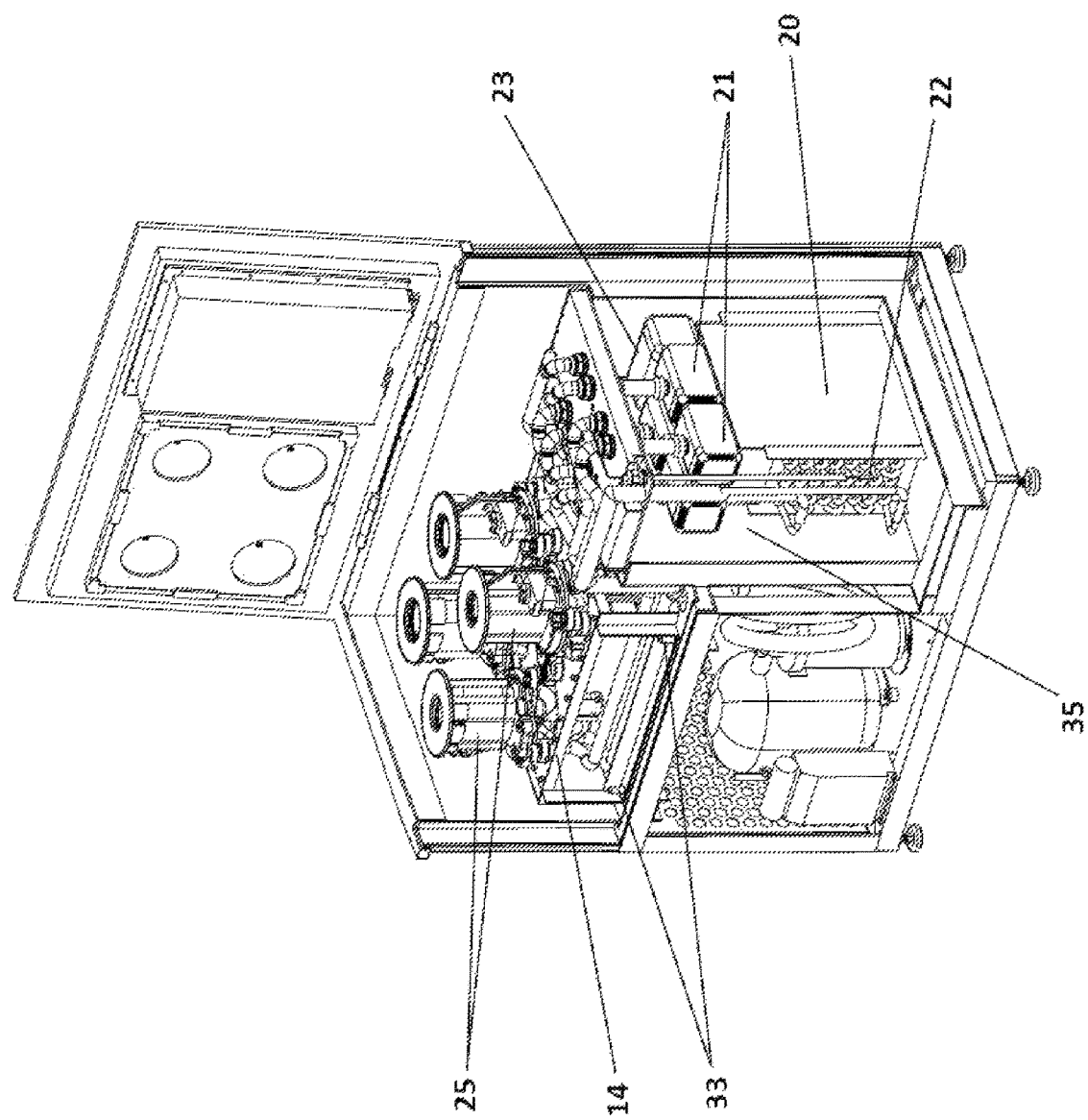
FIG. 8—Main cover open, Front and Right sections naked view.
Figure 9:
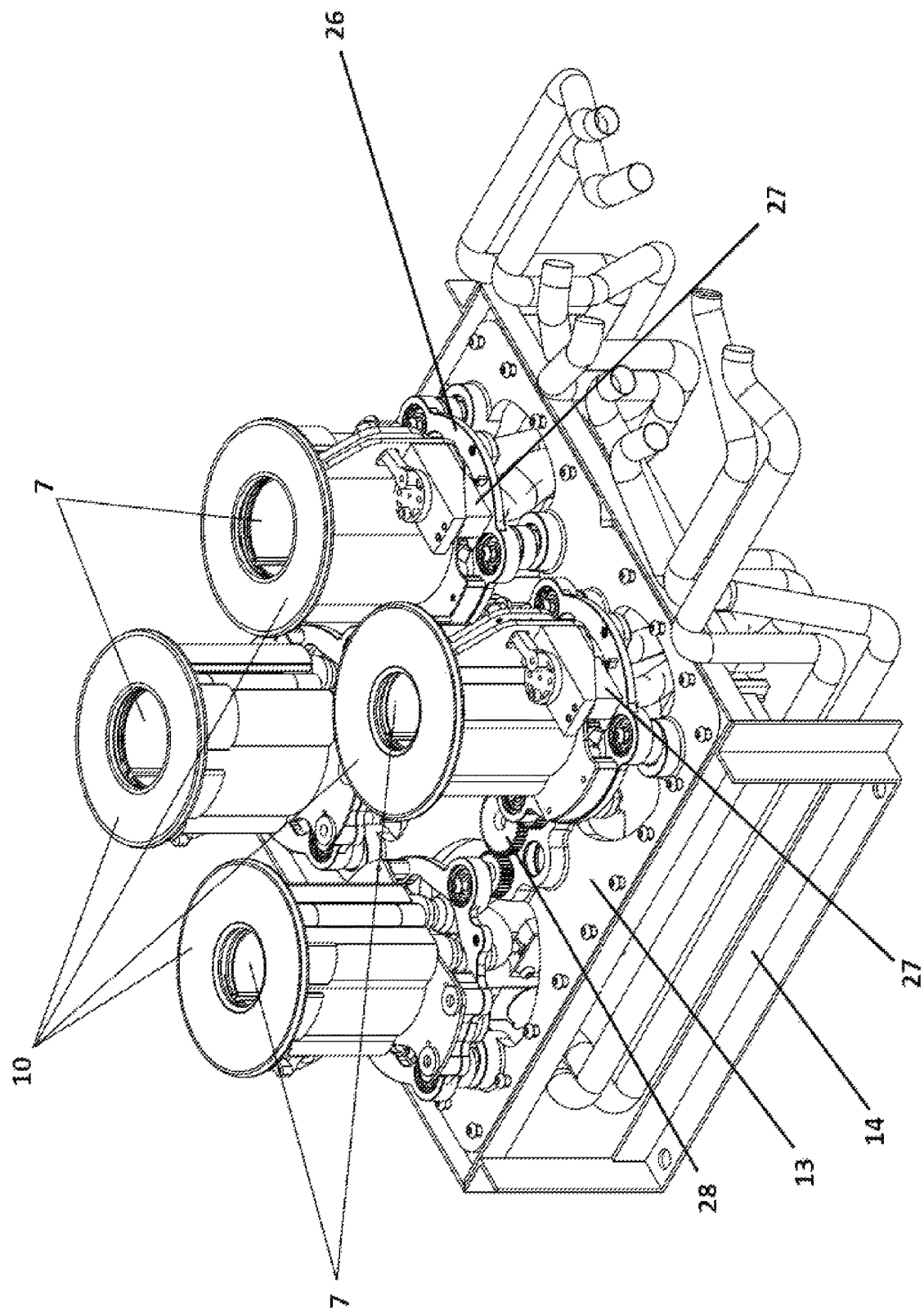
FIG. 9—Isometric view of the Orbital Shaker and Cooling blocks.
Figure 10:
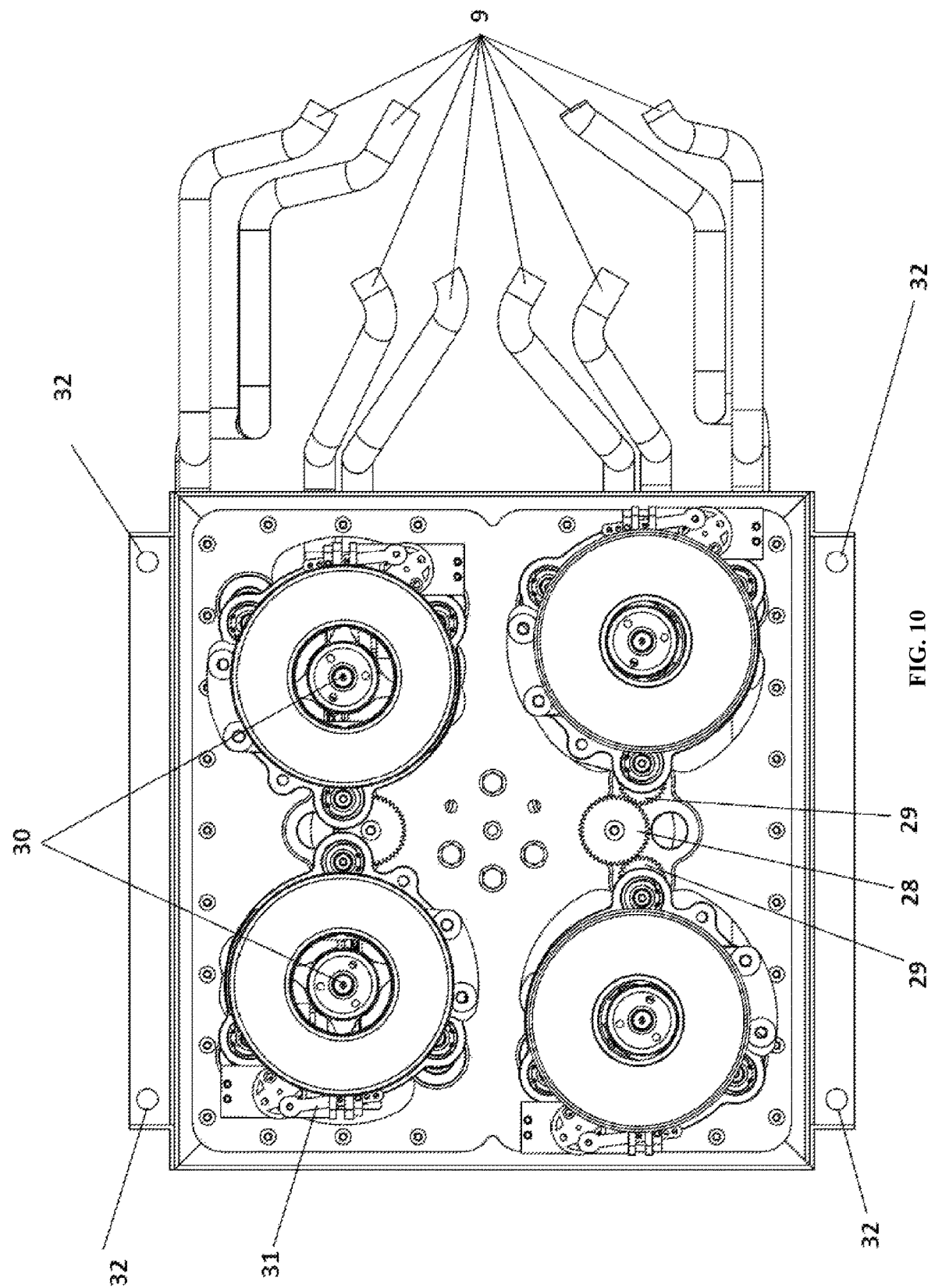
FIG. 10—Top view of the Orbital Shaker and Cooling blocks.
Figure 11:
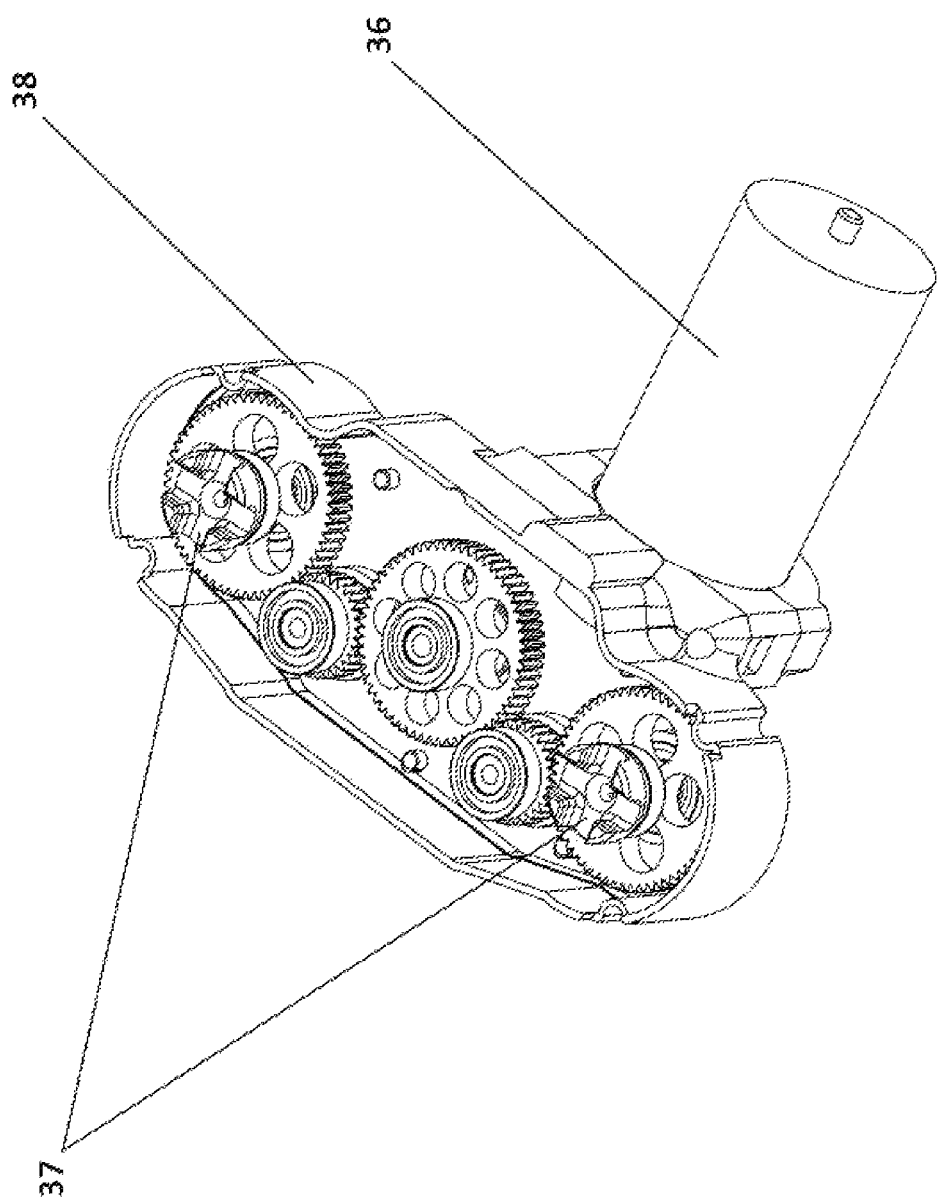
FIG. 11—Shaker Engine and Transfer box naked view.
Figure 12:
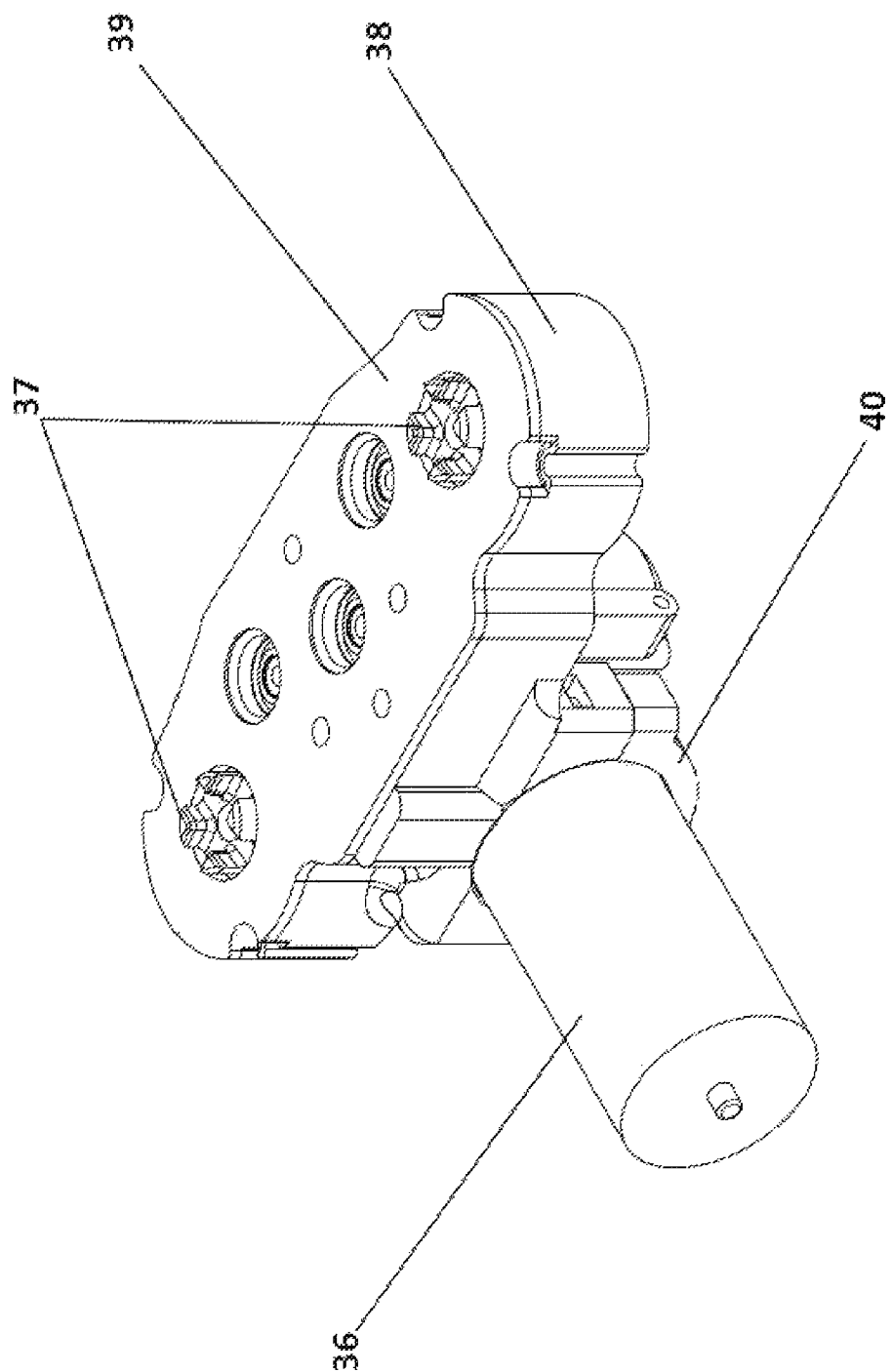
FIG. 12—Shaker Engine and Transfer box closed view.
Figure 13:
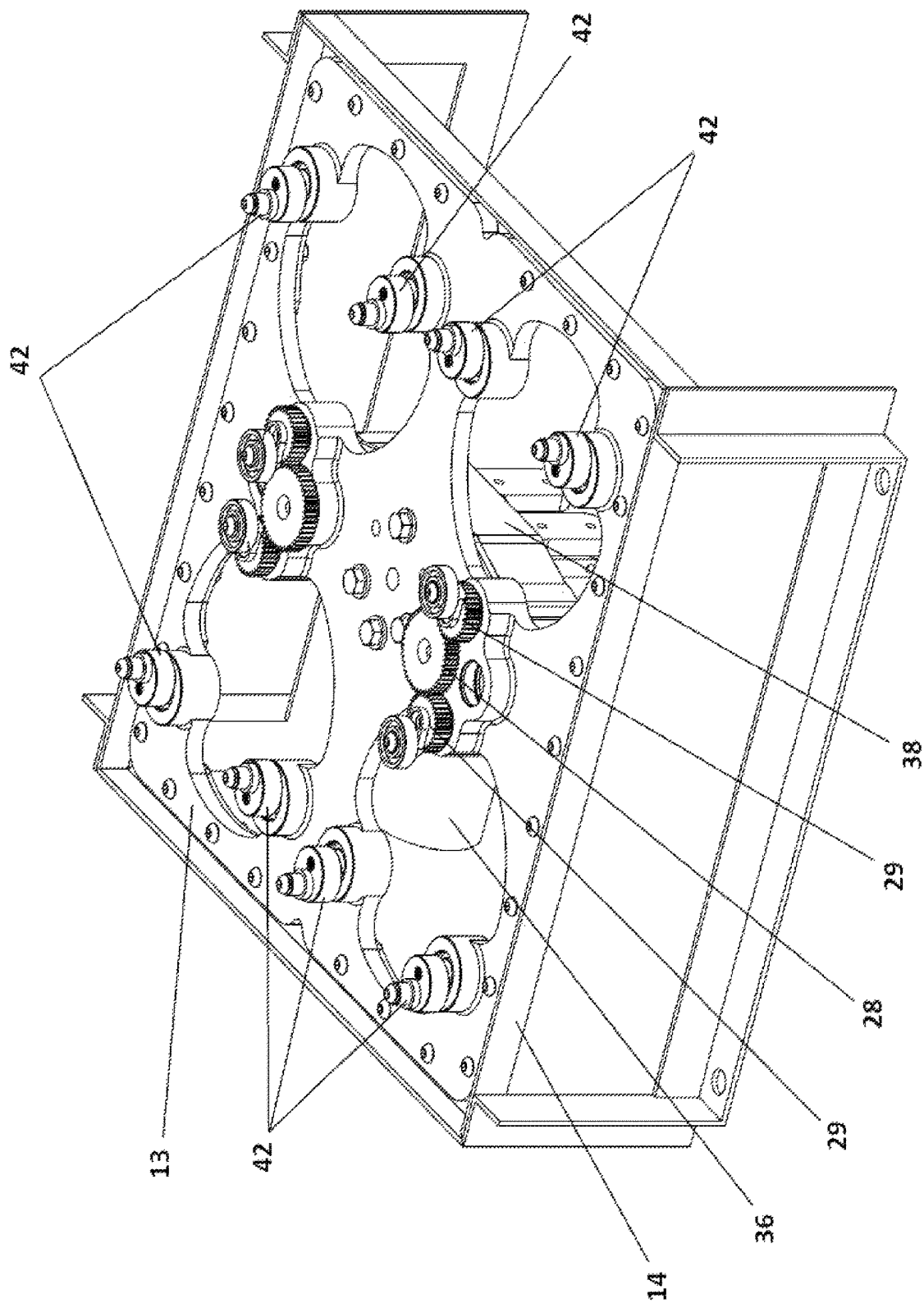
FIG. 13—Orbital Shake Transfer and Transport block view.
Figure 14:
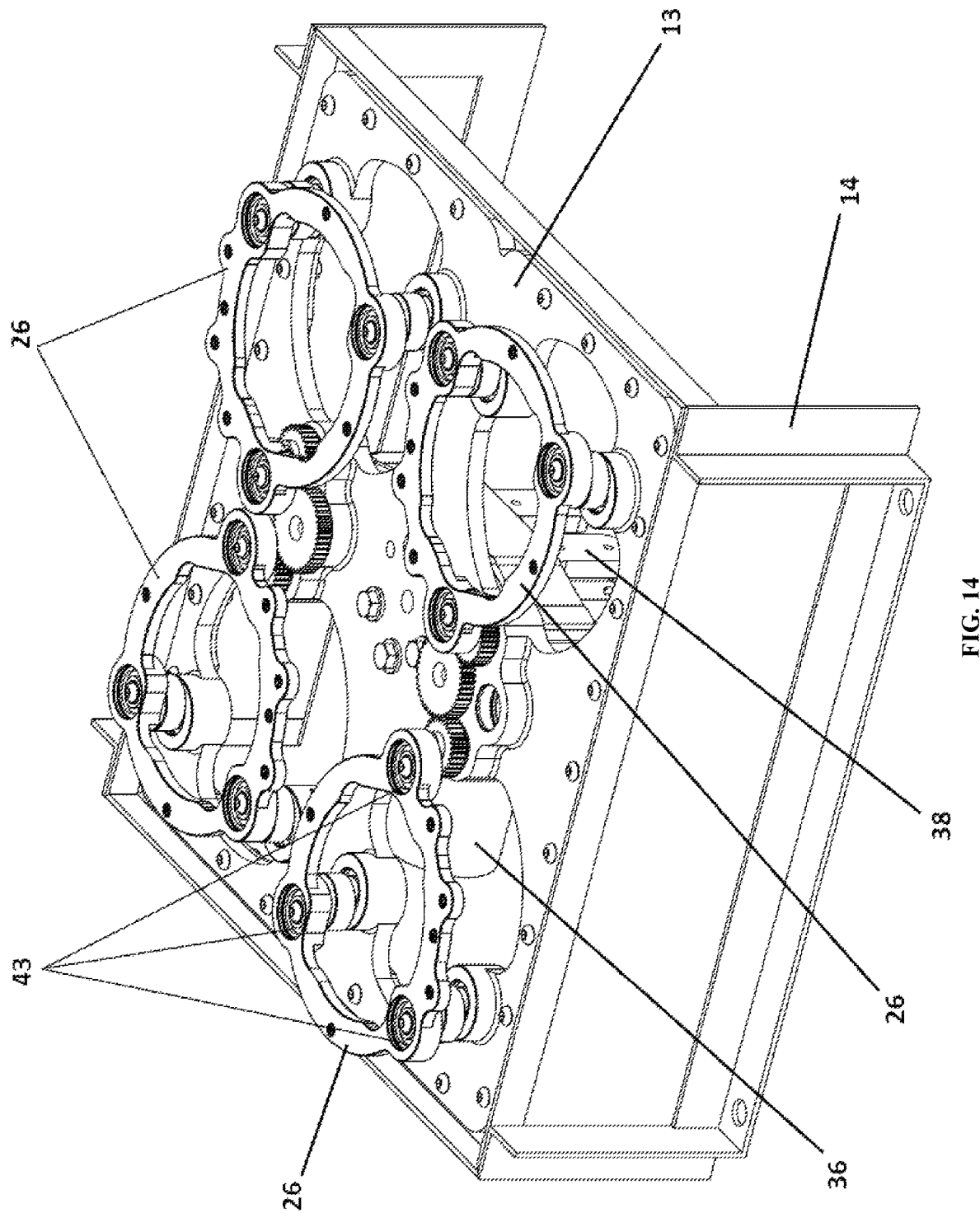
FIG. 14—View with added Cooling Block Base to the Orbital Shake Transfer and Transport block.
Figure 15:
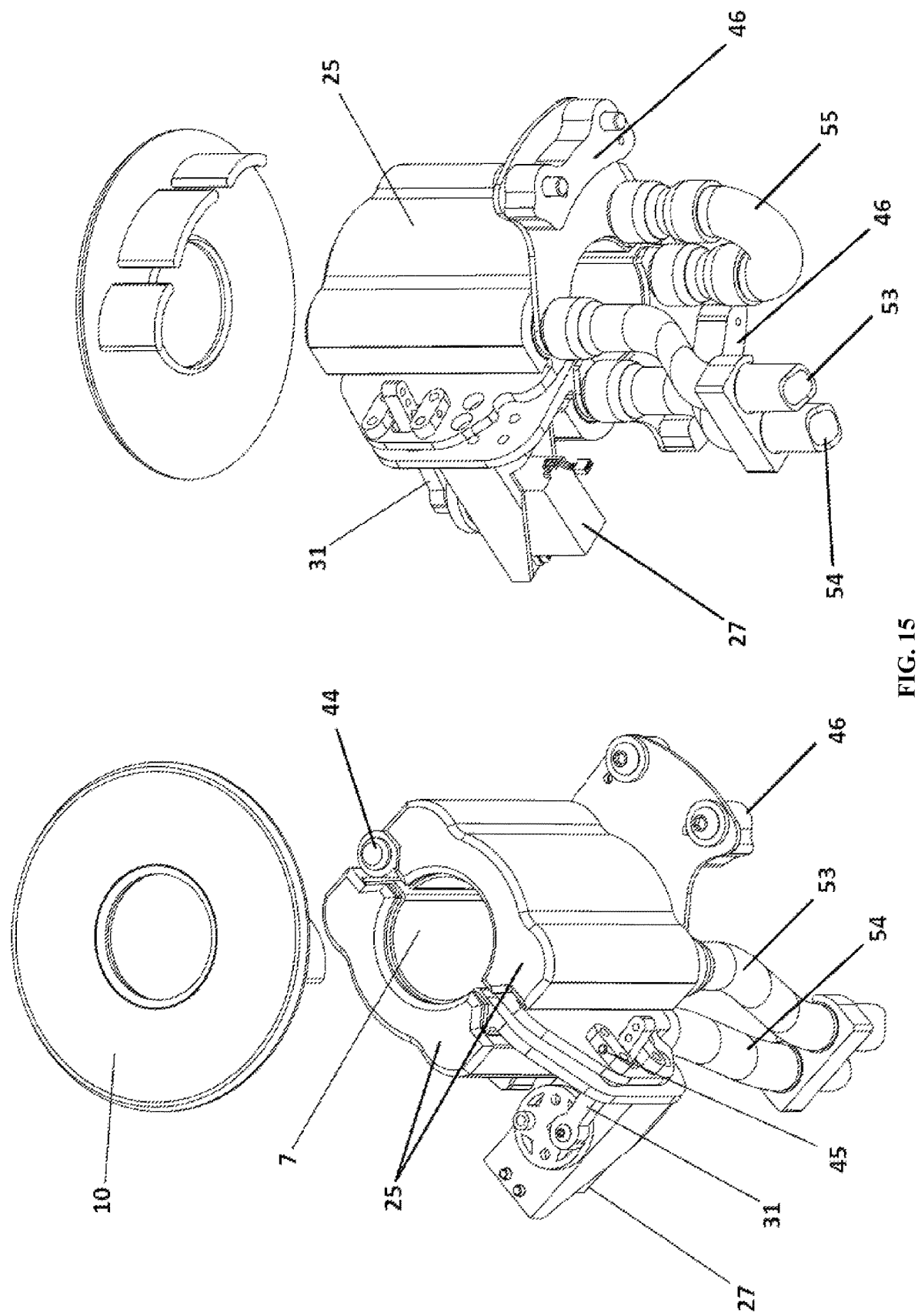
FIG. 15—Upper cross and lower cross Blasting view of the Cooling Block and Clamping Servo.
Figure 16:
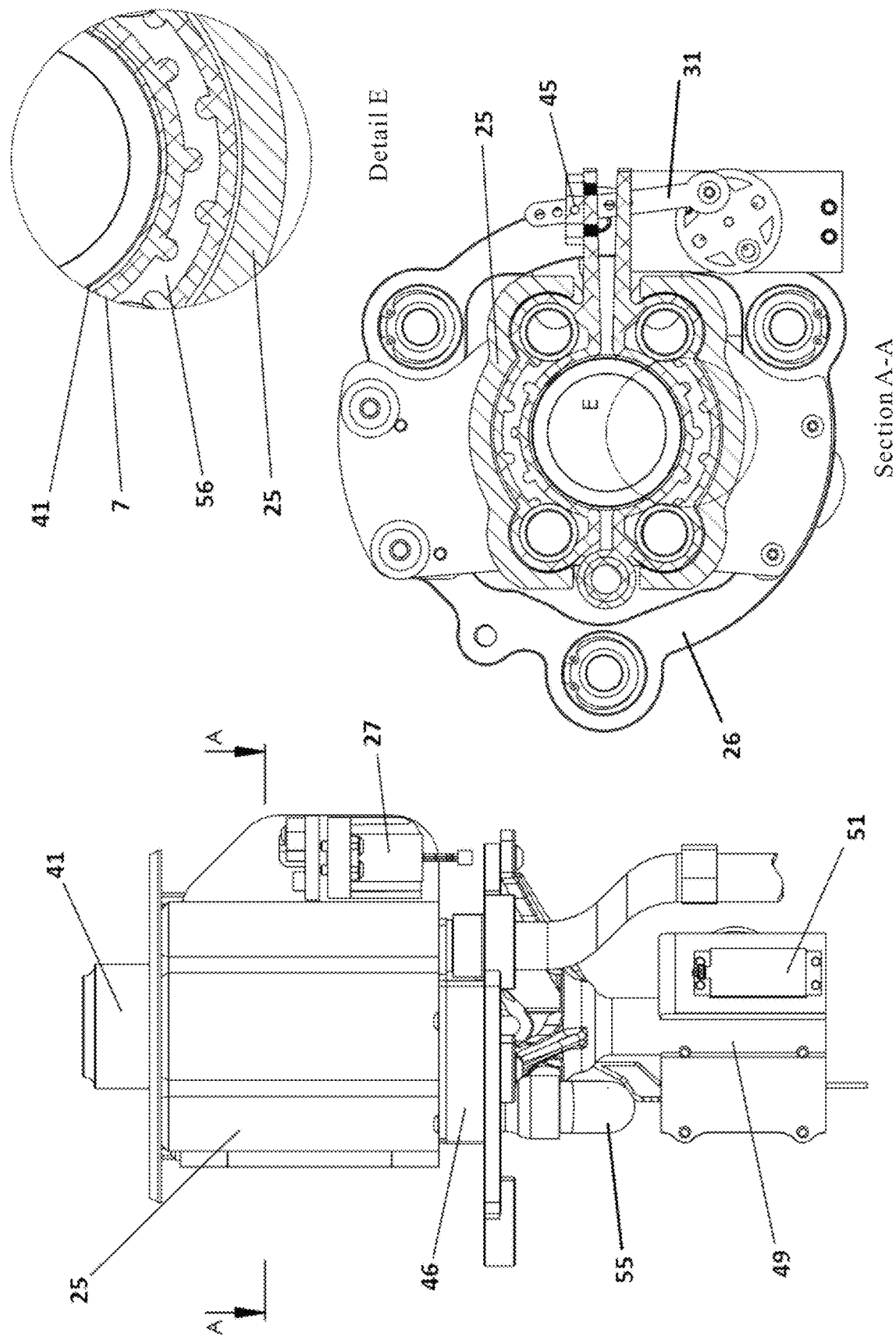
FIG. 16—Cooling Block front view and Cutaway top view while Clamping the Beverage.
Figure 17:
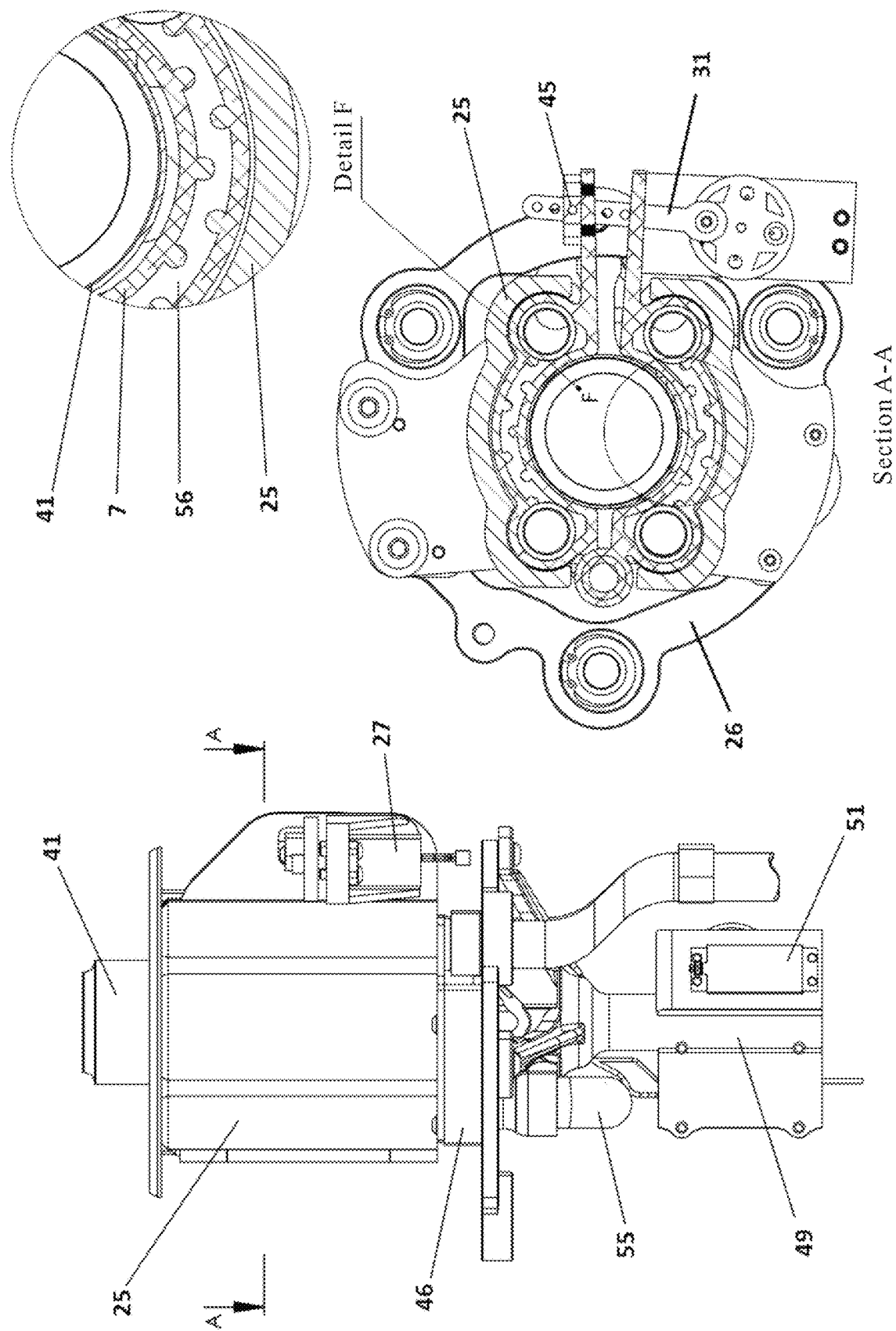
FIG. 17—Cooling Block front view and Cutaway top view while not Clamping the Beverage.
Figure 18:
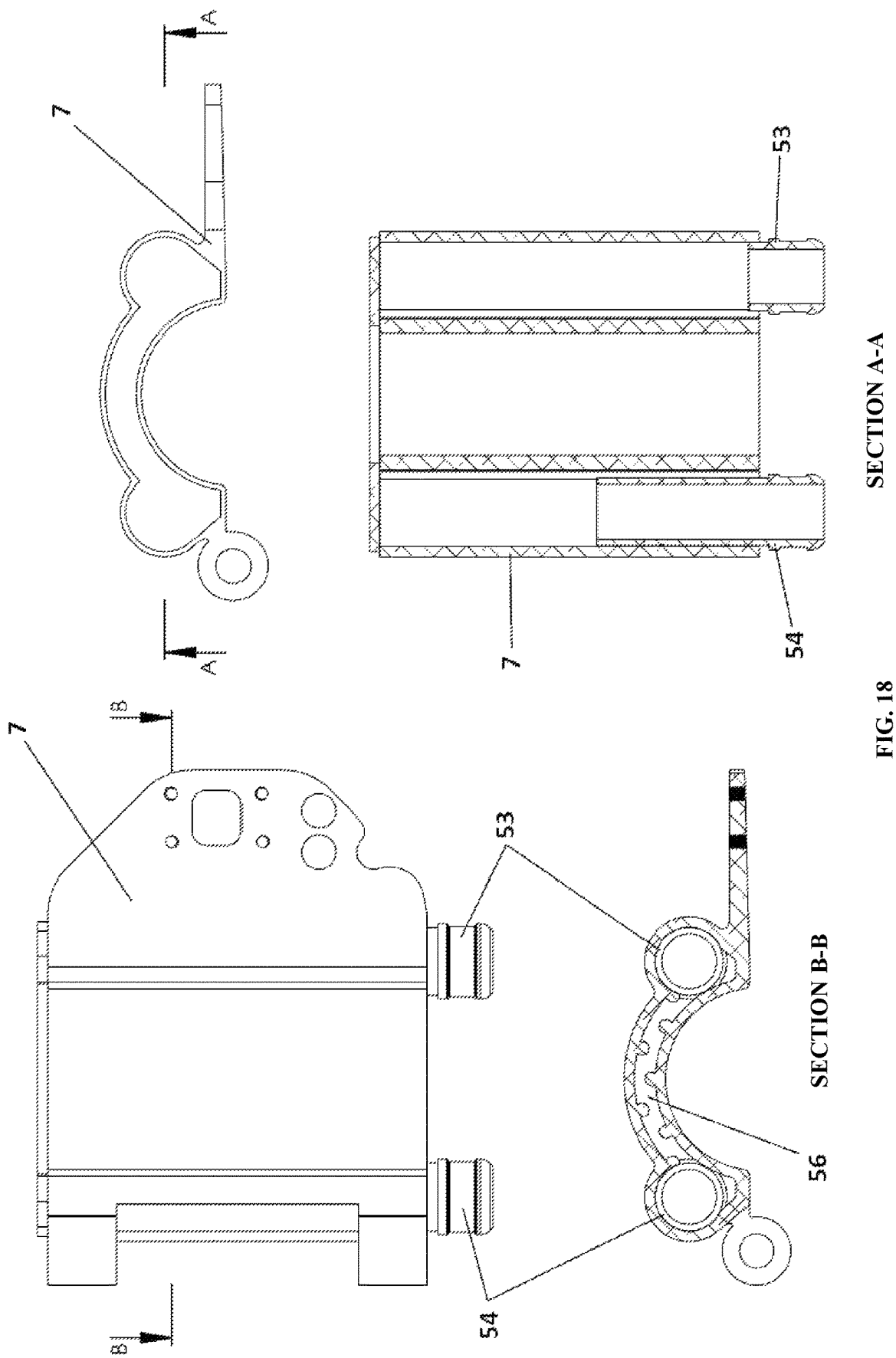
FIG. 18—Side and Top Section views of the Cooling Block.
Figure 19:
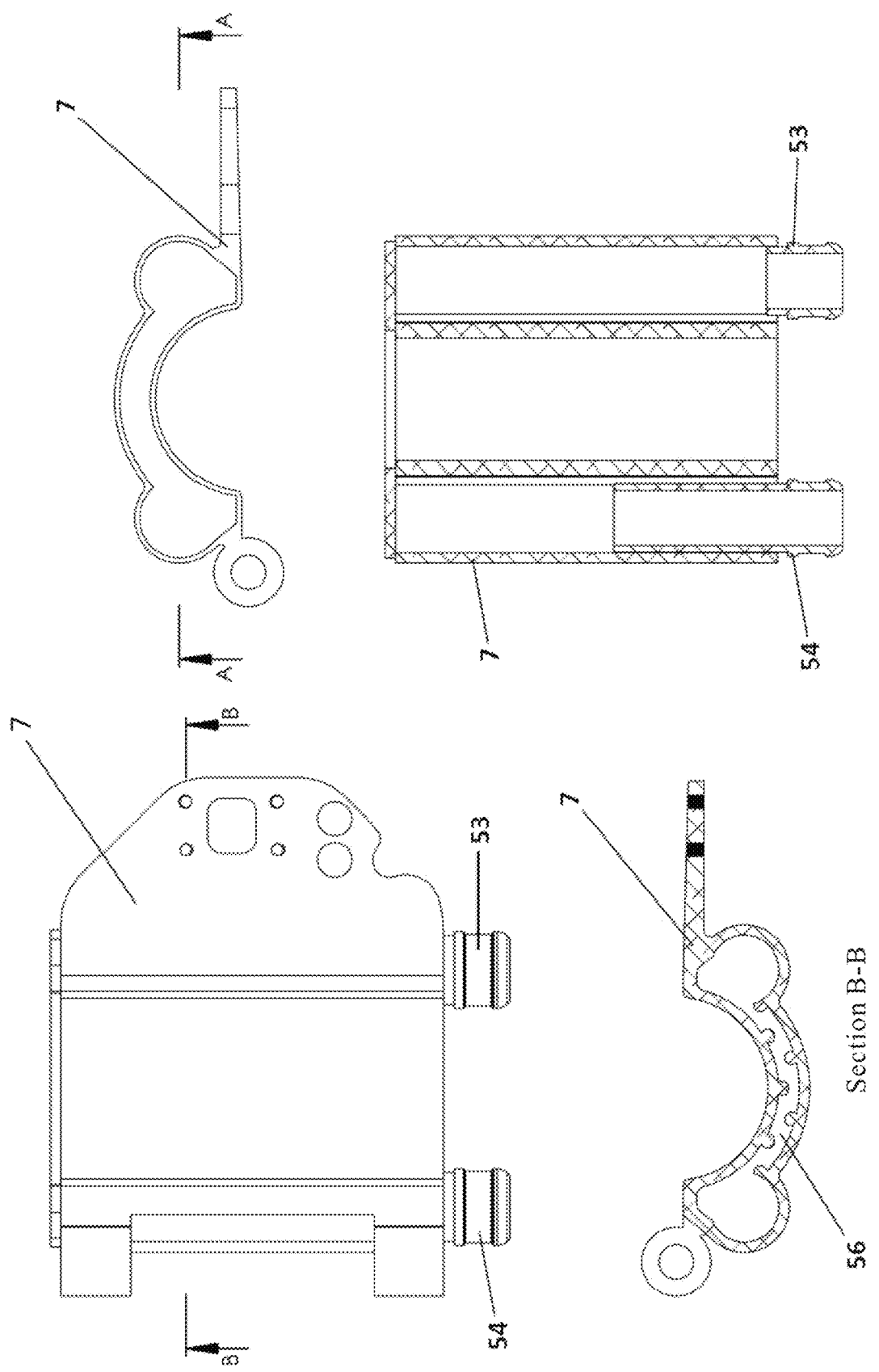
FIG. 19—Side and Bottom section views of the Cooling Block.
Figure 20:
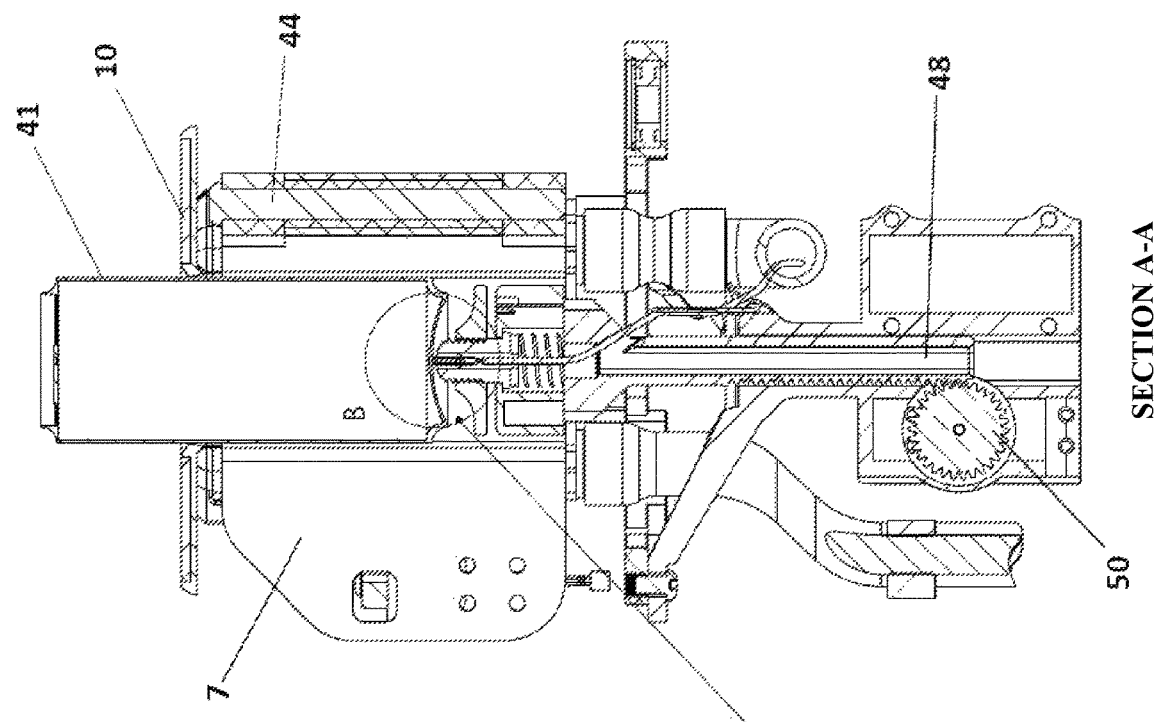
FIG. 20—Cooling block cutaway, lifting servo UP View when Clamping servo were Not Clamping.
Figure 20:
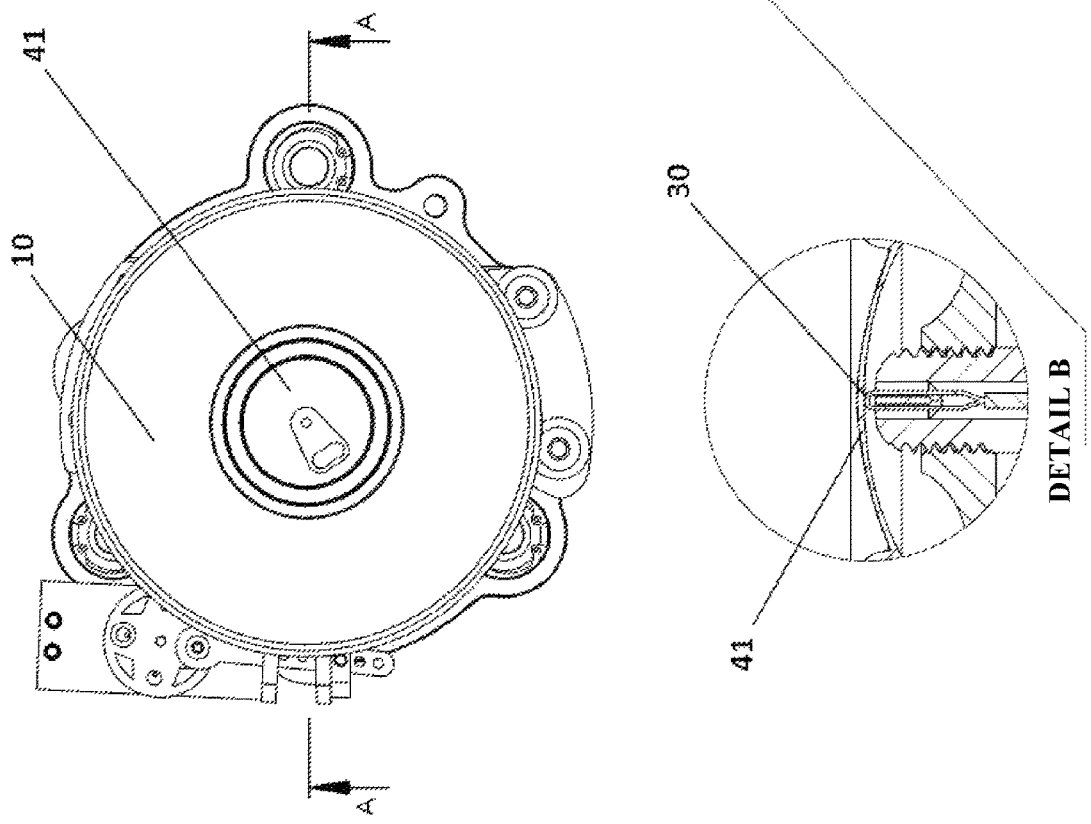
Figure 21:
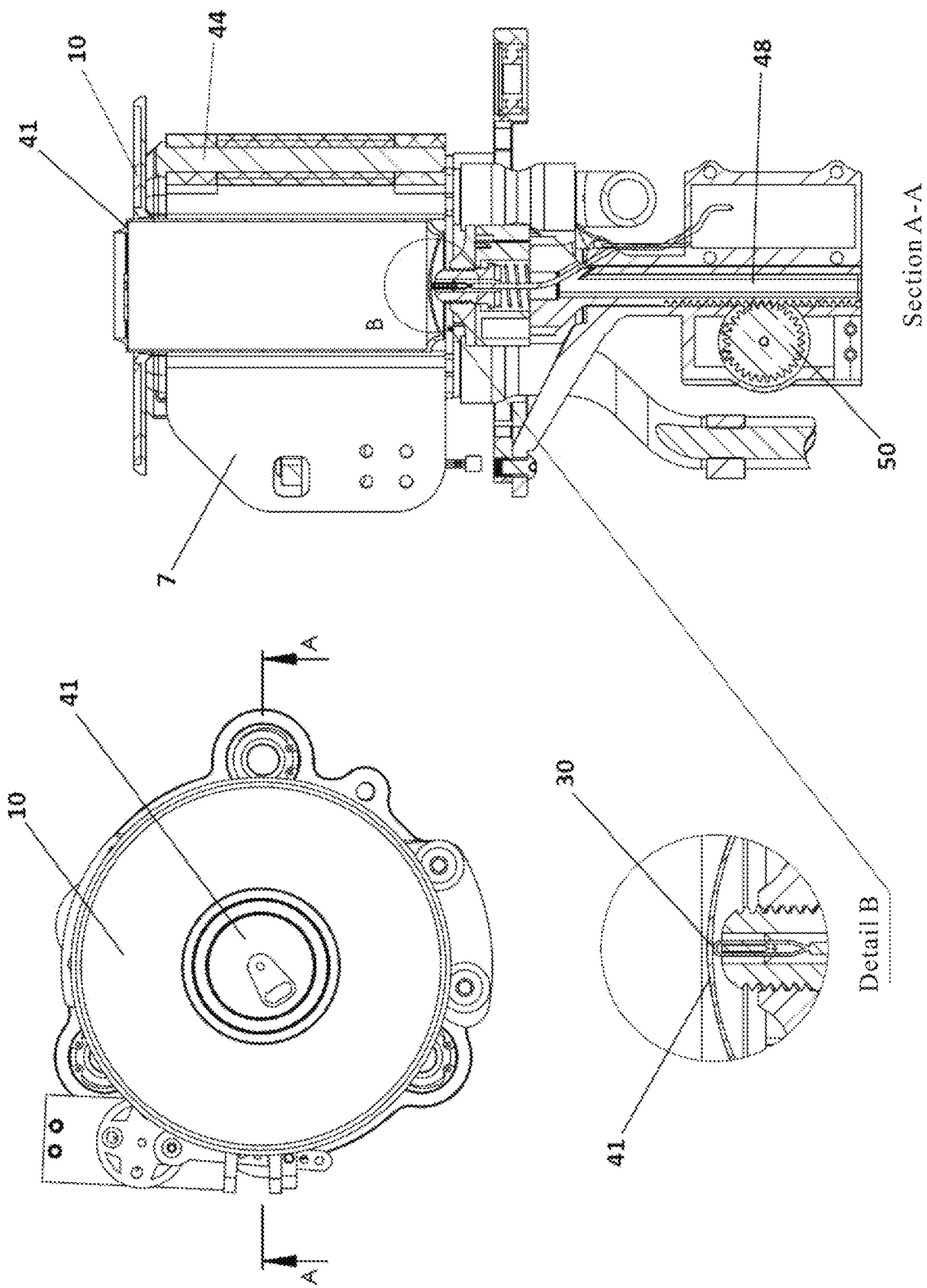
FIG. 21—Cooling block cutaway, lifting servo DOWN View when Clamping servo was Not Clamping.
Figure 22:
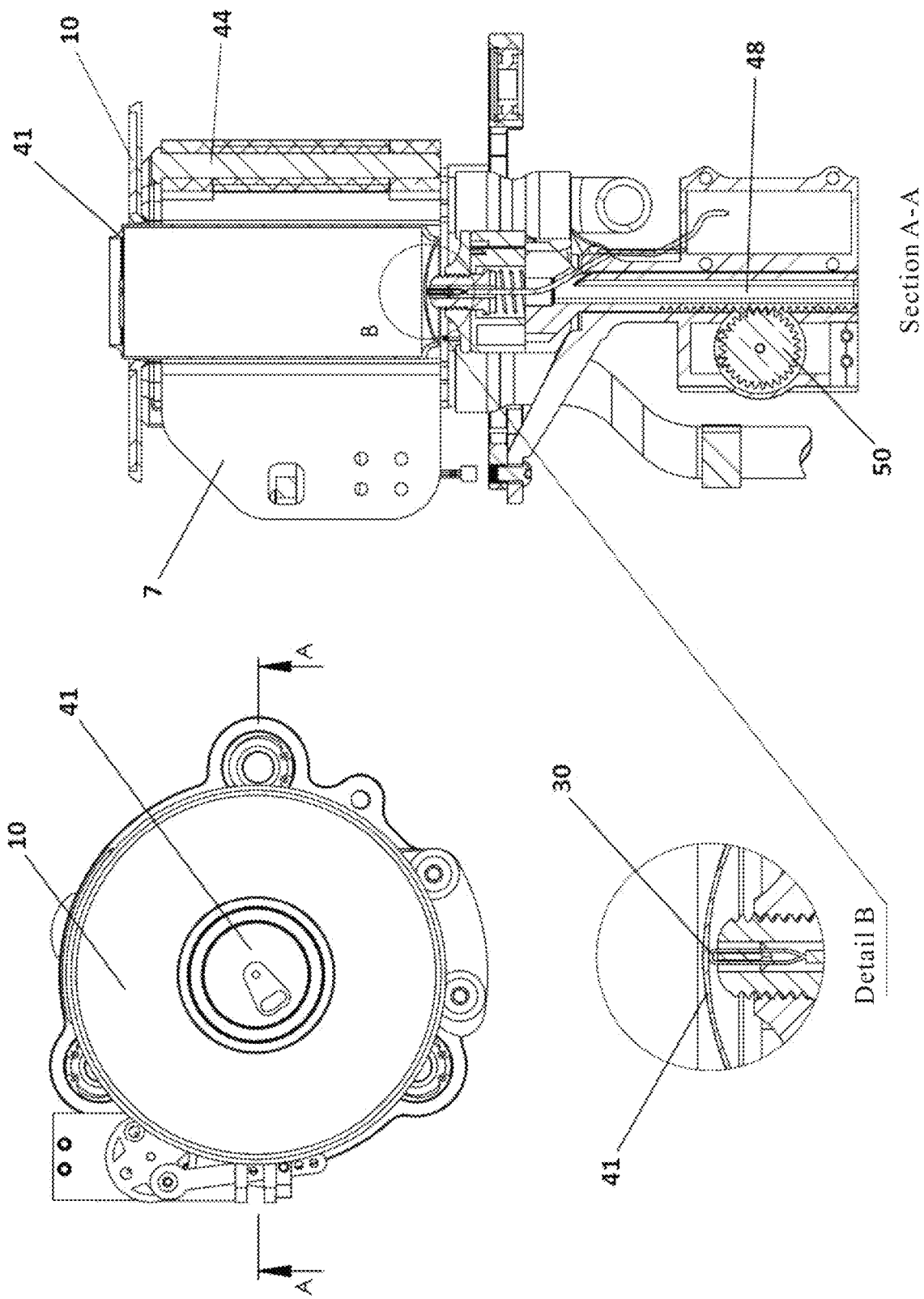
FIG. 22—Cooling block cutaway, lifting servo DOWN View when Clamping servo was Clamping.
Figure 23:
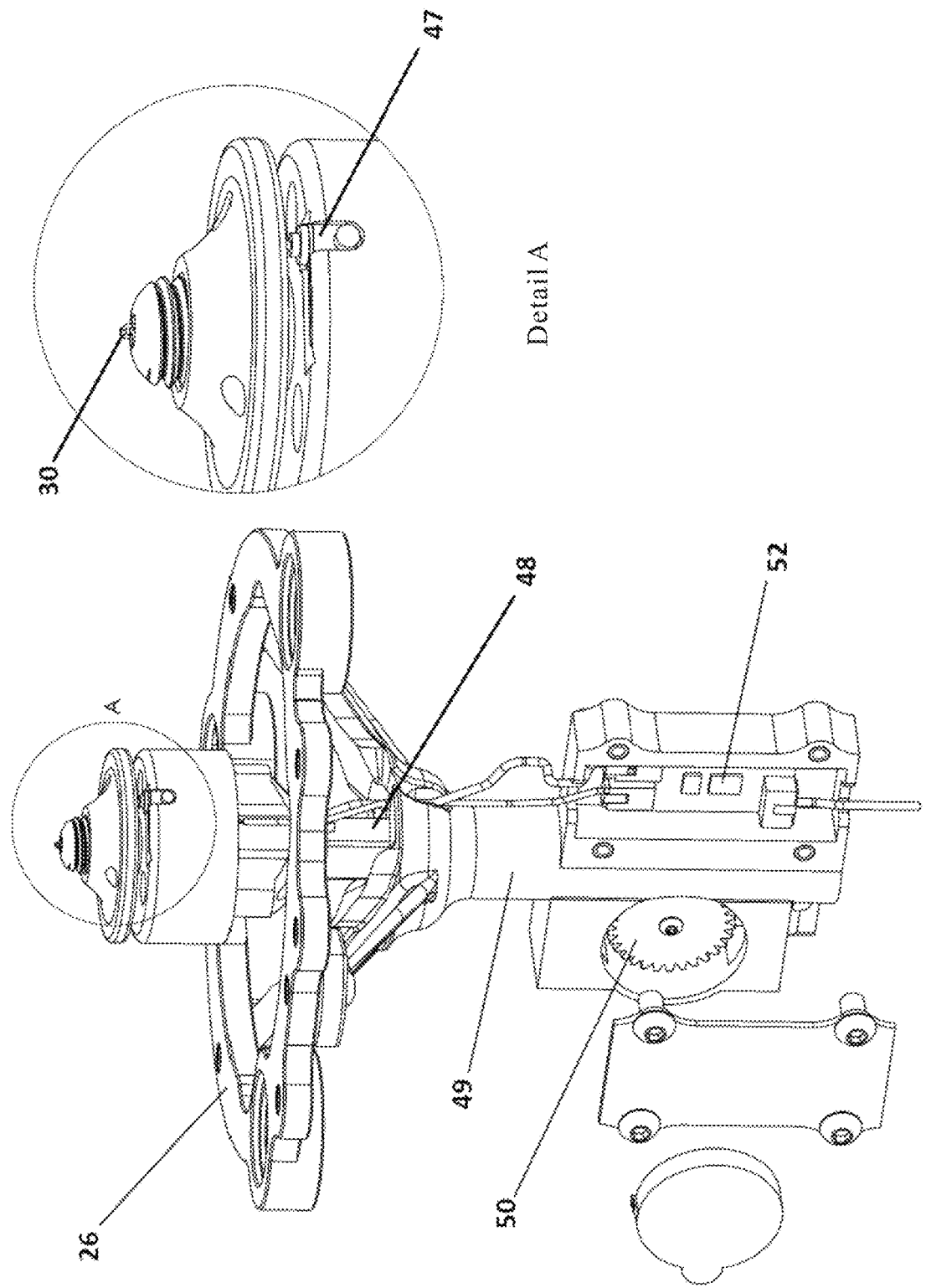
FIG. 23—Elevator mechanism and K-type thermocouple and Beverage button right cross view.
Figure 24:
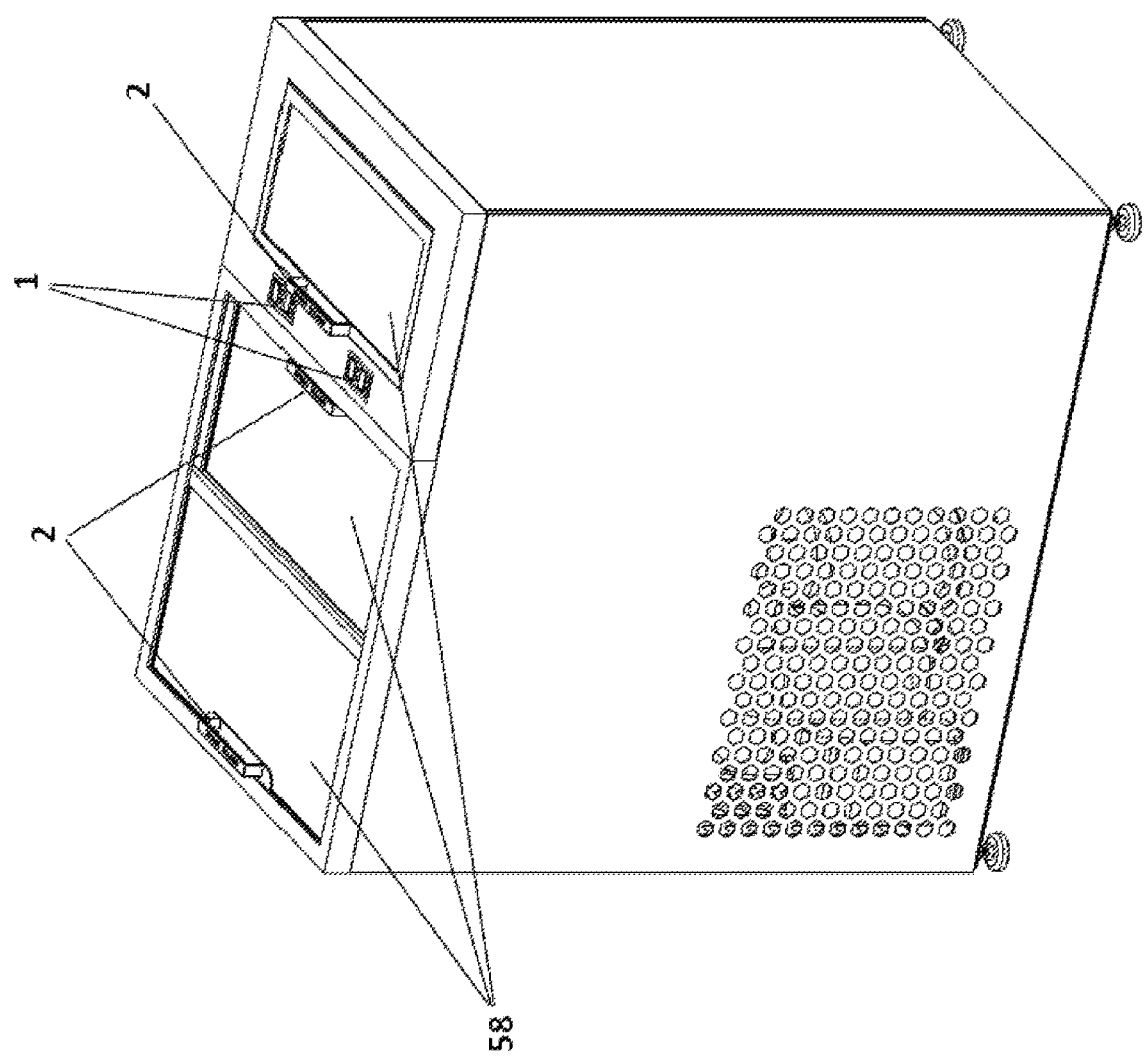
FIG. 24—General view of the model with Cold Stock area.
Figure 25:
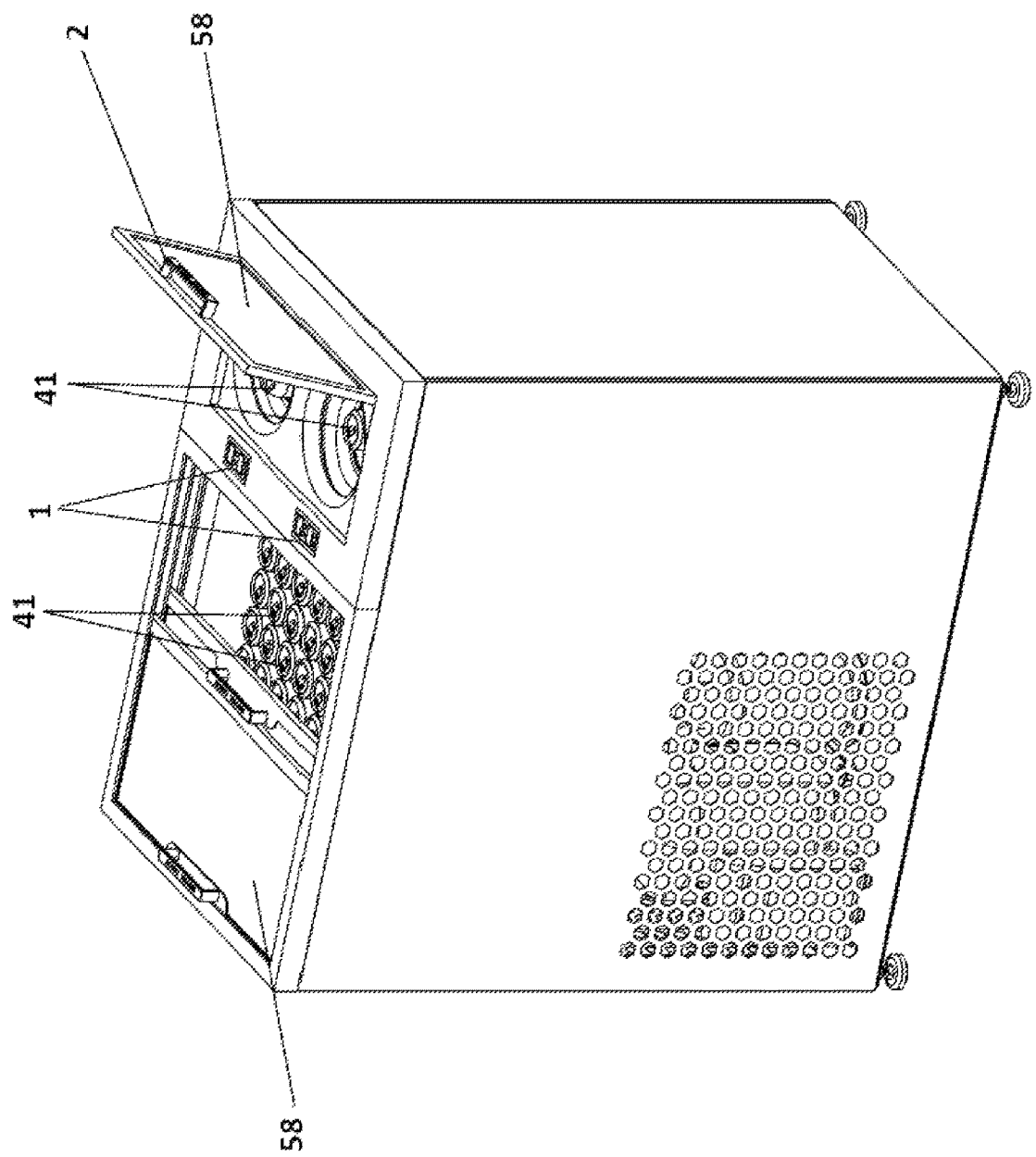
FIG. 25—Cold Stock area model covers open view
FIG. 26—Cold Stock area model cutaway Front view.
Figure 26:
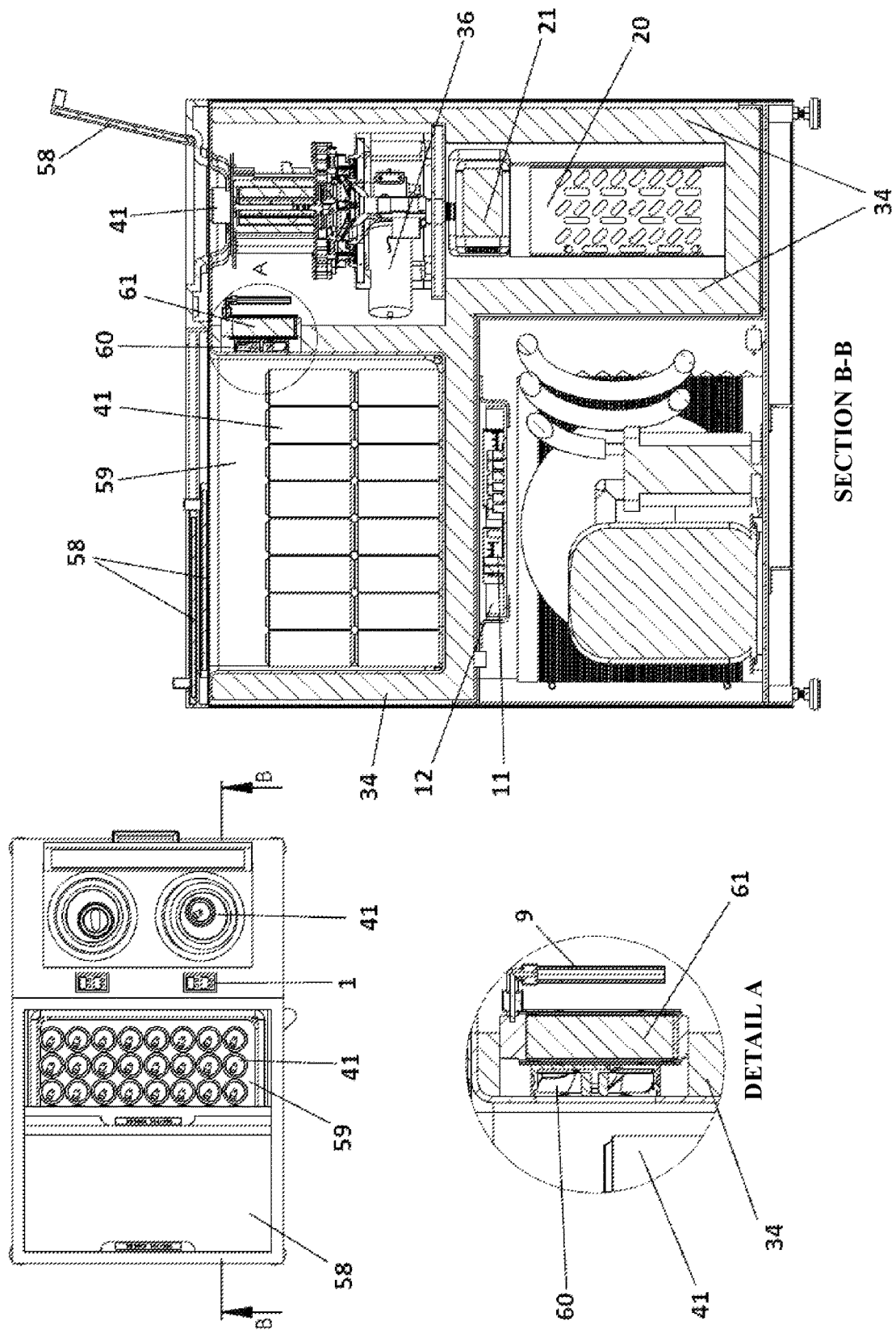

In order to better explain the instant cooler/freezer using the orbital shake method developed with this invention, the elements/sections/parts in the figures prepared are numbered separately and the explanation of each number is given below.
1. Screen
2. Handle
3. Service Cover
4. UVC Led Lamp
5. Service Cover Button
6. Hiding Cover
7. Cooling Block
8. Electrical Panel Cover
9. Hose
10. Cooling Block Header
11. PCB
12. Power Supply
13. Orbital Table
14. Orbital Frame
15. Liquid Tank Cover
16. Compressor
17. Compressor Electrical Box
18. Condenser
19. Liquid Tank
20. Evaporator
21. Cooling Pumps
22. Thermometer
23. Main Pump
24. Electricity Input Socket
25. Block Insulation PU
26. Block Base
27. Clamping Servo
28. Center Gear
29. Eccentric Gear
30. Thermocouple
31. Clamping Servo Arm
32. Insertion Slot
33. Insertion Pins
34. PU Main Insulation Case
35. Cooling Liquid Tank
36. Shaker Motor
37. Coupling
38. Transferring Body
39. Transferring Body Cover
40. Motor Stabilization
41. Beverage
42. Eccentric Hub
43. Roller
44. Block Hinge Shaft
45. Clamping Arm Pin
46. Block Base Insulation
47. Beverage Button
48. Thrust Shaft
49. Elevator Body
50. Elevator Gear
51. Elevator Servo
52. Mini PCB
53. Inlet Hose
54. Outlet Hose
55. U Hose
56. Cooling Liquid
57. Main Cover
58. Insulated Glass
59. Insulated Stock area
60. Fan
61. Radiator

DETAILED DESCRIPTION OF THE EMBODIMENTS

The subject of the invention is related to the instant cooler/freezer that uses the orbital shake method to cool packaged beverages and packaged food in a very short time.

Instant cooler/freezer using the orbital shake method contains the components of the cooling liquid (56), which can drop to −16° C. and lower degrees by preserving its fluidity from freezing, the main pump (23), which enables the cooling liquid (56) to be circulated in the system, Cooling pumps (21) that send the cooling liquid (56) to the cooling blocks (7), Hoses (9) carrying the cooling liquid (56) to the cooling blocks (7), Cooling liquid Tank (35) that stores the cooling liquid (56), PU Main Insulation Case (34) that prevents energy loss by insulating the cooling liquid (56) and all other equipment, Cooling Blocks (7) that cool the beverage (41) by circulating the cooling liquid (56) in the channeled structure inside, Block Hinge Shaft (44) that connects the cooling blocks to each other, Block Insulation PU (25) that prevents energy loss by insulating the cooling block (7), Clamping Servo (27) for clamping the beverage (41) by pulling the cooling blocks (7) towards each other, The Clamping Servo Arm (31), which is an extension of the Clamping Servo (27), the Clamping Arm Pin (45) for fixing the Clamping Servo Arm (31), Short-length Inlet Hose (53) where the cooling liquid (56) is introduced into the Cooling Block (7), The tall Outlet Hose (54) through which the cooling liquid (56) exits from the cooling block (7), The Cooling Block Header (10), which is located on the cooling block (7), allows various lighting or visual applications and at the same time protects the mechanism, Block Insulation Base (46), that provides thermal insulation while connecting the cooling block (7) to the block base (26), Eccentric Hub (42) with central deflection that enables the cooling block (7) to perform the orbital shake movement, Block Base (26), which serves as a base for connecting the Eccentric Hub (42) and the cooling block (7), Thermocouple (30) that measures the instantaneous ° C. of the beverage (41) and informs the PCB (11), PCB (11), which decides which equipment will work by processing the data it receives from the thermocouple (30), Beverage Button (47) to understand which cooling block (7) has the beverage (41), Mini PCB (52) that processes the data received from the thermocouple (30) and beverage button (47) and sends instant data to the PCB (11) continuously, Elevator Servo (51), which goes down at the beginning of the cooling process and goes up at the end and serves the beverage (41), the elevator gear (50), which is the extension of the elevator servos (51), The Elevator Body (49), which is the body of the Push Shaft (48), the elevator servo (51) and other equipment guided by the elevator gear (50), U Hose (55), which helps to provide circulation between the cooling blocks (7), The Monitor (1) that enables the communication of the user with the machine, the Service cover (3) that protects the cooling blocks (7) and the beverages (41), the Handle (2) to facilitate the opening of the service cover (3), UVC Led Lamps (4) that sterilizes the beverages being cooled (41), Service cover Button (5) that protects the customer from the moving parts and UVC led lamps (4) during the cooling process and stops the entire system if the service cover (3) is opened, Power Supply (12) providing electricity to the system at the correct volts, Electrical Panel Cover (8), which protects the power supply (12) PCB (11) and the screen (1) from moisture and liquid splashes, hiding cover (6) in order to prevent the entry of hands and similar objects between the cooling blocks (7), Main Cover (57), which protects all of the mechanisms and provides thermal insulation at the same time, Eccentric Gear (29) transmitting the orbital shake motion to the block base (26), Orbital Table (13), to which eccentric gear (29) and eccentric hubs (42) are connected by means of bearings, bearings (43) that facilitate circular rotation in moving mechanisms, Orbital Frame (14) carrying the cooling blocks (7) and the orbital plate (13), Locating Pins (33) that enable the Orbital Frame (14) to be placed and fixed to the PU main insulation case, the Insertion Slot (32) that the locating Pins (33) will enter to, shaker motor (36) that powers the orbital shake movement, transferring body (38), which is a bedding for the transfer of the motion coming from the shaker motor (36), transfer body cover (39) that protects the gears in the transmission body (38), The Coupling (37), which will transfer the movement from the Shaker motor (36) to the Center gear (28), Evaporator (20) that provides cooling for the cooling liquid (56), compressor (16) circulating the cooling gas, condenser (18) cooling the cooling gas, The Liquid Tank (19) where the excess cooling gas returning from the evaporator (20) is stored in liquid form, Compressor Electrical Box (17) regulating the electricity of the compressor (16), Thermometer (22) measuring the degree of cooling liquid (56) ° C. and informing the PCB (11).

The screen (1) used in an embodiment of the present invention is a touch screen.

It is characterized by including the Cooled Beverage Insulated Stock Area (59) where the cooled beverages (41) are stored, the Radiator (61) that can provide cold air to the Insulated Stock Area (59), the Fan (60) elements that direct the cold in the Radiator (61) to the Insulated Stock Area (59).

The packaged beverage (41) cooling in the flash cooler/freezer system using the orbital shake method is gripped by the cooling blocks (7) made of materials with high thermal conductivity and squeezed by the clamping servo (27) the energy of the cooling liquid (56) is transferred to the packaged beverage (41) by direct contact. The cooling blocks (7) can also be made with flexible materials if necessary, and they can take the shape of the beverage package (41) placed inside, and the purpose of this process is to transfer heat to the beverage package (41) by direct contact. While this clamping and holding process is being realized, both the transfer of the cooling liquid (56) to the cooling blocks (7) and the orbital shake movement starts at the same time.

The orbital shake method is the most efficient and fastest method of mixing packaged beverages (41) without opening the package. Thanks to the orbital shake method, the cold energy coming into contact from the cooling blocks (7) is transferred into the beverage (41) as fastest and homogeneously as possible. The Cooling Blocks (7) can be changed according to the size and shape of the package of the beverage (41) desired to be cooled. Thus, pet, plastic, glass, aluminum, cardboard and so on. all packages are cooled, regardless of their type.

The product is designed to cool 1 or more beverages at the same time. In the center of every cooling block (7), there is a beverage button (47) and a thermocouple (30) belongs to that block. When the beverage is placed in the cooling block, the machine recognizes this and starts to measure the ° C. degree of beverage (41) in that block instantaneously at the same time. This process is done simultaneously in each cooling block (7) containing the beverage (41). The user determines how many Milliliters of beverage has been put into which cooling block by using the screen (1). The user also determines which beverage they want to cool and how many degrees they desire through the display. By having the data in ° C. degrees milliliters in each block, the machine calculates how many seconds and in what order it will send cooling liquid (56) to which cooling block. The user gives the Start command on the Touchscreen after placing the beverages (41) in the cooling halls and closing the Service cover (3). By following the start command, the UVC Led lamps (4) light up and the disinfection process begins, the elevator servos (51) lower the beverages (41) to their predetermined positions where they can be best gripped by the cooling blocks, following this process, the Clamping servos (27) compress the beverages (41) inside the cooling blocks (7). Following this process, the cooling liquid (56) is sent to the cooling blocks (7) guided by the PCB (11) for a period of time calculated. Orbital shake movement starts at the same time.

Orbital Shake movement causes vibration as it is known, therefore, this problem is avoided thanks to the special placement and deviations we have developed. The method is as follows, each cooling block starts to rotate in the same direction as another cooling block, but with a deflection of 180 degrees. Approximately equal weight 2 blocks are rotated with an oscillation that dampens each other. In this way, the oscillation is reduced.

In detail, a circle with a diameter of 1 unit with a center (0,0) point is drawn on the X, Y coordinate plane. Hypothetically, it makes one round of the circle in 4 seconds. The cooling blocks at zero moment;

In the 0 second, the A block is at the (−1,0) point, while the B block is at the (1,0) point.

In the 1st second, the A block is at the (0,1) point, while the B block is at the (0, −1) point.

In the 2nd second, the A block is at the (1,0) point, while the B block is at the (−1,0) point.

In the 3rd second, the A block is at the (0,−1) point, while the B block is at the (0,1) point.

In the 4th second, the A block goes back to the (−1,0) point, while the B block also goes back to the (1,0) point.

In a full turn like this, both blocks absorb the oscillation and prevent the machine from vibrating thanks to their own weight and equal speed.

In a model where single beverage (41) is intended to be cooled, a counterweight can also be used instead of the B block to dampen the release.

If desired, a QR code reader or a barcode reader can be added to each cooling block to count the cooled beverages. This counting information is transferred from PCB (11) to the desired points via internet.

The area where the Cooling Blocks (7) are located is inside the PU Main insulation case (34), is thermally insulated from the external environment and is kept at an average range of 2° C. to 10° C. In the case that this area is heated, even if there is no beverage in it, cold liquid is sent to the cooling blocks (7) by the command of the PCB (11) and this area is cooled. Purpose of this process is to stay prepared to next beverage cooling by keeping cooling blocks cool. The cooling liquid (56) is also located in the cooling liquid tank (35) part of the PU main insulation case (34) and has a thicker insulation layer. Thermal insulation has a very high affect on electricity consumption.

Thanks to all these insulations and direct contact with the beverages (41), only as much energy is transferred to the beverage (41) being cooled. Energy loss is minimized, so electricity consumption and carbon emissions are very low compared to standard cabinets and competitors in the present market.

What is claimed is:

1. An instant cooler/freezer using an orbital shaking movement, comprising:
   a cooling liquid configured to decrease from −16° C. to −60° C. by preserving the cooling liquid fluidity without freezing,
   a main pump providing the cooling liquid to be circulated in a system,
   cooling pumps sending the cooling liquid to cooling blocks,
   hoses carrying the cooling liquid to the cooling blocks,
   a cooling liquid tank, which stores the cooling liquid,
   a PU main insulation case that prevents energy loss by insulating the cooling liquid and all other equipment,
   the cooling blocks cool a beverage by circulating the cooling liquid in a channeled structure inside,
   a block hinge shaft connecting the cooling blocks,
   a clamping servo, which is used to compress the beverage by pulling the cooling blocks towards each other,
   a clamping servo arm, which is an extension of the clamping servo,
   a short-length inlet hose where the cooling liquid is introduced into each cooling block,
   a tall-length outlet hose through which the cooling liquid exists from each cooling block,
   a cooling block header, located on each cooling block, allowing various illumination or visual applications and at the same time protects the cooling blocks,
   an eccentric hub with central deflection that enables each cooling block to perform the orbital shaking movement,
   a block base, functioning as a base for connecting a ventricular core and the cooling blocks,
   a thermocouple that measures an instantaneous temperature degree of the beverage and informs a PCB,
   the PCB, which decides which equipment will work by processing a data the PCB receives from the thermocouple,
   a beverage button useful for understanding which cooler block contains the beverage,
   a mini PCB processing the data received from the thermocouple and the beverage button and sends instant data to the PCB continuously,
   an elevator servo going down at a beginning of a cooling process and going up at an end and serves the beverage,
   an elevator gear, which is an extension of the elevator servo,
   a thrust shaft controlled by the elevator gear,
   an elevator body, which is the body of the elevator servo and other equipment,
   a U hose that helps to provide circulation between the cooling blocks,
   a screen providing a user to communicate with the instant cooler/freezer,
   a service cover protecting the cooling blocks and beverages,
   a service cover button protecting the user from moving parts during the cooling process and stops the entire system if the service cover is opened,
   a power supply providing electricity to the system in correct volts,
   an electrical panel cover, protecting the power supply PCB and the screen from moisture and liquid splashes,
   a hiding cover preventing an entry of hands and similar objects between the cooling blocks,
   a main cover providing a thermal insulation,
   an eccentric gear transmitting the orbital shake movement to the block base,
   an orbital table, to which the eccentric gear and eccentric hubs are connected by bearings,
   the bearings facilitate a circular rotation in moving mechanisms,
   an orbital frame carrying the cooling blocks and the orbital table,
   a shaker motor powering a transferring body,
   the transferring body, which is a bedding for a transfer of a motion coming from the shaker motor,
   a transferring body cover protecting gears in the transferring body,
   a coupling transferring movement from the shaker motor to a central gear,
   an evaporator providing cooling of the cooling liquid,
   a compressor circulating a cooling gas,
   a condenser cooling the cooling gas,
   a liquid tank, where an excess of cooling gas returning from the evaporator is stored in liquid form,
   a compressor electrical box regulating an electricity of the compressor, and
   a thermometer measuring a degree of the cooling liquid (C) and notifying the PCB.

2. The instant cooler/freezer according to claim 1, further comprising a block insulation PU preventing an energy loss by insulating the cooling block.

3. The instant cooler/freezer according to claim 1, further comprising a clamping arm pin for fixing the clamping servo arm.

4. The instant cooler/freezer according to claim 1, further comprising a block insulation base providing a thermal insulation while connecting the cooling blocks to the block base.

5. The instant cooler/freezer according to claim 1, further comprising a handle to facilitate the opening of the service cover.

6. The instant cooler/freezer according to claim 1, further comprising locating pins allowing the orbital frame be placed and fixed to the PU main insulation case.

7. The instant cooler/freezer according to claim 6, further comprising an insertion slot where the locating pins will enter.

8. The instant cooler/freezer according to claim 1, further comprising a cooled beverage insulated stock area where cooled beverages are stocked.

9. The instant cooler/freezer according to claim 8, wherein the insulated stock area comprises a radiator configured to provide cold air when necessary.

10. The instant cooler/freezer according to claim 9, further comprising a fan, which leads the cold air in the radiator to the insulated stock area.

11. The instant cooler/freezer according to claim 1, wherein the screen is a touch screen.

12. The instant cooler/freezer according to claim 1 further comprising UVC led lamps sterilizing beverages that are being cooled.

13. An orbital shake method, comprising the steps of:

placing a beverage in a cooling block of an instant cooler/freezer, the instant cooler/freezer detects that the beverage is placed in the cooling block, the instant cooler/freezer measures a temperature of the beverage in the cooling block instantaneously, checking the temperature of the beverage in the cooling block that contains beverage, a user uses a screen to determine how many milliliters of beverage has been put into the cooling block, the user uses the screen to select which beverage and how many degrees he/she wants to cool, calculating how many seconds and in what order the instant cooler/freezer will send cooling liquid to the cooling block, with a data of temperature degrees (° C.) and milliliters in the cooling block, the user gives a start command on the screen after placing beverages in cooling halls and closing a service cover, after the start command is given, UVC led lamps lights up and a disinfection process starts, elevator servos lower the beverages to predetermined positions where they will be gripped by the cooling block, clamping servos compresses the beverages in the cooling block, sending cooling liquid to the cooling block guided by a PCB for a calculated time, starting an orbital shake movement, and rotating the cooling block in the same direction as another cooling block, but with a 180-degree deviation.

\* \* \* \* \*